United States Patent [19]
Oshima et al.

[11] Patent Number: 5,463,212
[45] Date of Patent: Oct. 31, 1995

[54] LATENT IMAGE FORMING MEMBER AND METHOD OF MANUFACTURING, LATENT IMAGE READING APPARATUS AND LATENT IMAGE READING SYSTEM

[75] Inventors: Toshio Oshima, Toride; Tsunemi Ohiwa, Osaka; Masato Nishida, Kyoto; Taiji Matsumoto, Takatsuki; Akihiko Itoh, Uji; Yoji Takeuchi, Toride, all of Japan

[73] Assignee: Hitachi Maxell, Ltd., Osaka, Japan

[21] Appl. No.: 170,270

[22] PCT Filed: May 7, 1993

[86] PCT No.: PCT/JP93/00596

§ 371 Date: Jan. 4, 1994

§ 102(e) Date: Jan. 4, 1994

[87] PCT Pub. No.: WO93/22147

PCT Pub. Date: Nov. 11, 1993

[30] Foreign Application Priority Data

| May 7, 1992 | [JP] | Japan | 4-114841 |
| Jun. 24, 1992 | [JP] | Japan | 4-166316 |
| Sep. 8, 1992 | [JP] | Japan | 4-239629 |

[51] Int. Cl.$^6$ .................................................. G06K 7/10
[52] U.S. Cl. .................. 235/468; 235/491; 235/471; 235/454; 250/271; 250/239
[58] Field of Search .................. 235/454, 462, 235/468, 491, 487; 250/271, 472.1, 492.1, 239; 283/92, 901, 204

[56] References Cited

U.S. PATENT DOCUMENTS

| 3,169,186 | 2/1965 | Howard | 235/491 X |
| 3,473,027 | 10/1969 | Freeman et al. | 235/491 X |
| 3,483,388 | 12/1969 | Ogle et al. | 250/271 |
| 3,691,350 | 9/1972 | Kuhns et al. | 235/471 X |
| 3,812,328 | 5/1974 | Tramposch | 235/487 |

(List continued on next page.)

FOREIGN PATENT DOCUMENTS

| 59017683 | 1/1984 | European Pat. Off. . |
| 0163114 | 12/1985 | European Pat. Off. . |
| 0368570 | 5/1990 | European Pat. Off. . |
| 2225091 | 9/1990 | European Pat. Off. . |
| 0435109 | 7/1991 | European Pat. Off. . |
| 0524336 | 1/1993 | European Pat. Off. . |
| 2073468 | 12/1970 | France . |
| 2555337 | 5/1985 | France . |
| 2664055 | 1/1992 | France . |
| 3339209 | 10/1983 | Germany | 235/454 |
| 52-80906 | 12/1975 | Japan . |
| 53-9607 | 1/1978 | Japan . |
| 53-9600 | 1/1978 | Japan . |
| 54-33634 | 3/1979 | Japan . |
| 54-033634 | 3/1979 | Japan | 250/271 |
| 56-564 | 1/1981 | Japan . |
| 58-140875 | 8/1983 | Japan . |
| 59-208675 | 11/1984 | Japan . |

(List continued on next page.)

*Primary Examiner*—Donald Hajec
*Assistant Examiner*—Michael G. Lee
*Attorney, Agent, or Firm*—Birch, Stewart, Kolasch & Birch

[57] ABSTRACT

In order to provide a latent image forming member which is capable of surely reading information to have high reliability and which can be used for a long time, the latent image forming member comprises a base (4a), and an information indication layer (2) formed on the base (4a) and having a latent image pattern, in which fluorescent grains are dispersed and held, so that the information indication layer (2) is irradiated with light having a predetermined wavelength to excite the fluorescent grains and luminescent light information from the fluorescent grains is optically read, wherein reflectance of a surface of the base (4a) with respect to light having the predetermined wavelength is 20% or higher, a projection amount T of the information indication layer 2 from the top surface of the base (4a) is restricted to a range of 0.5 to 20 μm, and a protection sheet (6a) is laminated onto the base (4a) as to cover all over the information indication layer (2).

18 Claims, 32 Drawing Sheets

U.S. PATENT DOCUMENTS

| | | | |
|---|---|---|---|
| 3,919,447 | 11/1975 | Kilmer, Jr. et al. | 235/491 X |
| 3,949,219 | 4/1976 | Crouse | 250/239 X |
| 4,151,667 | 5/1979 | Idelson et al. | |
| 4,157,784 | 6/1979 | Gröttrup et al. | 235/491 |
| 4,202,491 | 5/1980 | Suzuki | 235/491 |
| 4,282,430 | 8/1981 | Hatten et al. | 250/239 X |
| 4,647,766 | 3/1987 | Dimur et al. | 250/227 |
| 4,757,188 | 7/1988 | Nakarai et al. | 235/454 |
| 4,816,659 | 3/1989 | Bianco et al. | 235/454 X |
| 4,983,817 | 1/1991 | Dolash et al. | 235/491 X |
| 5,210,411 | 5/1993 | Oshima et al. | 235/491 X |

FOREIGN PATENT DOCUMENTS

| | | | |
|---|---|---|---|
| 63-165185 | 7/1988 | Japan . | |
| 1211089 | 8/1989 | Japan . | |
| 3258594 | 11/1991 | Japan . | |
| 486336 | 1/1976 | U.S.S.R. | 250/239 |

PRIOR ART

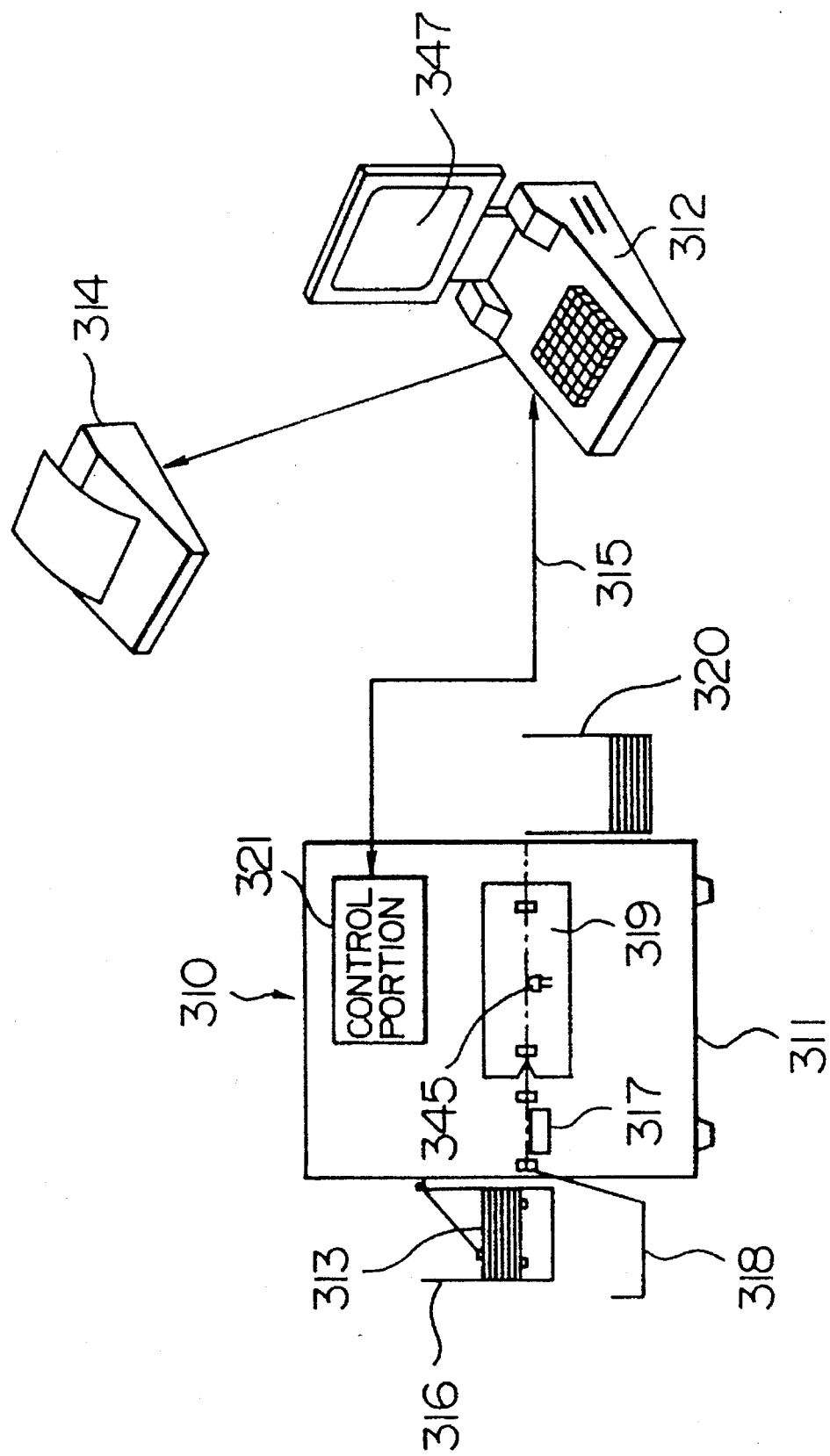

LATENT IMAGE FORMING MEMBER AND METHOD OF MANUFACTURING, LATENT IMAGE READING APPARATUS AND LATENT IMAGE READING SYSTEM

BACKGROUND OF THE INVENTION

1. Technical Field

The present invention relates to a latent image forming member, such as an ID card, and more particularly to a latent image forming member having a latent image pattern, such as a bar code having fluorescent grains dispersed and held therein, and a method of manufacturing the same.

The present invention also relates to a latent image reading apparatus for reading data recorded in the form of a latent image of a fluorescent material which emits light when it is stimulated by infrared rays, from an object on which the latent image has been formed. More particularly, the present invention relates to an arrangement and characteristics of an infrared ray source for irradiating a latent image with infrared rays and of a light detection device for detecting excited light from the latent image.

The present invention further relates to an information recording medium having a latent image mark and a system for reading the same, and more particularly to a configuration of the latent image mark and of an optical system of a reading apparatus.

2. Discussion of Related Art

In recent years, control of articles by means of bar codes has been performed widely in various industrial fields while centering the PDS (Point Of Sales) in the distribution field. Along with this, a suggestion has been made that a non-visible bar code, chat is, a latent image bar code is put on in terms of improving design and security (see, for example, Japanese Patent Application Laid-Open No. 52-80906).

As for manufacturing of the latent image bar code, a method has been suggested (see, for example, Japanese Patent Application Laid-Open No. 53-9607) in which a ribbon containing fluorescent grains is made to be transferred to paper upon impact so that the latent image bar code is printed on to the paper.

At present, if the latent image bar code of the foregoing type is formed on an ID card for use as a credit card or the like, there arise a problem of unsatisfactory durability, such as the wear resistance and chemical resistance against, for example, alcohol. It will come to be difficult to read the latent image bar code as the card is repeatedly used. Therefore, the code of the foregoing type has a disadvantage that the card cannot be used for a long time.

Further, a latent image reading apparatus has been known (see for example Japanese Patent Application Laid-Open No. 52-80906 and Japanese Patent Application Laid-Open No. 53-9600) in which data recorded in the form of a latent image of a florescent substance that emits light when it is stimulated by infrared rays, is read from paper on which the latent image has been formed.

The latent image can be obtained by printing, for example, on white paper or plastic, with ink which is obtained by mixing 200 g of sodium yttrium fluoride ($NaYF_4$) fluorescent substance activated by, for example, ytterbium and erbium with 160 g of vinyl chloride type resin and 40 g of plasticizer, followed by dispersing the mixture in a 400 g of solvent. When the latent image of the foregoing type is irradiated by infrared rays, for example, a gallium arsenide (GaAs) infrared ray emitting diode, the ink emits light, the excited light having a wavelength different from that of the infrared ray. The reading apparatus for reading the latent image receives the excited light from the ink, and treat or process a signal of the light to read out the data recorded in the latent image.

Since the excited light obtainable from the latent image is very weak, if infrared rays from the infrared ray source is not efficiently applied to the latent image or if the excited light from the latent image is not efficiently incident upon a light detection device disposed in the reading apparatus, a high level of reading signal cannot be obtained and reading error is liable to occur.

In order to overcome a problem of the foregoing type, a conventional reading apparatus has been formed, as shown in FIG. 17 and FIG. 18, in such a manner that an excellent-directivity infrared ray source and a light detection device are used.

FIG. 17 is a view which illustrates an example of a conventional latent image reading apparatus mainly composed of a card 101 having a latent image 102 printed on the top surface thereof, an infrared ray source 103 for irradiating the latent-image printed portion of the card 101, a stem 104 for holding the infrared ray source 103, a light detection device 105, a filter 106 disposed in front of a light receiving surface of the light detection device 5 and permitting only light emitted from the latent image 102 to mass there-through, a light-conductive member 107, such as an optical fiber, which leads light emitted from the latent image 102 to the filter 106, and a terminal 108 for reproducing data from an output signal from the light detection device 105. In this latent image reading apparatus, the stem 104 is disposed in a manner inclined relative to the normal direction of the card 101 in order to dispose the infrared ray source 103 adjacent to the card 101 as much as possible while preventing an interference with the conductive member 107. It is advantageous to minimize the inclination angle θ to improve the light emitting efficiency and the light receiving efficiency. However, a large inclination angle is actually likely to become larger than 30 degrees to 40 degrees. Further, the latent image reading apparatus is unable to efficiently lead the light emitted from the latent image 102 into the light detection device 105 by disposing the light-conductive member 107 extending from a portion where the card 101 is passed to a portion where the filer 106 is disposed.

FIG. 18 is a view which illustrates a second example of a conventionally known latent image reading apparatus. This apparatus has an arrangement to improve the efficiency of irradiating the latent image-printed portion of the card 101 by the infrared ray source 103 by coaxially disposing a collimator lens 109 and a focusing lens 110 in front of the infrared ray source 103. Since the residual portions are the same as those of the apparatus shown in FIG. 17, the corresponding portions are given the same reference numerals and their descriptions are omitted here.

An actual apparatus is assembled by a process in which a mold serving as a member holder is made by a plastic molded part, followed by inserting and fixing members such as the infrared ray source 103, the stem 104, the light detection device 105, the filter 106 and the light-conductive member 107. Therefore, the conventional apparatus has a vertical hole and an inclined hole so that the light detection device 105, the filter 106 and the light conductive member 107 are coaxially inserted into the vertical hole to be fixed therein, while the infrared ray source 103 and the stem 104 (and further the collimator lens 109 and the focusing lens 110 in the apparatus shown in FIG. 18) are coaxially inserted into the inclined hole to be fixed therein.

However, an operation for inserting the infrared ray source 103 and the stem 104 into the inclined hole suffers from an excessively unsatisfactory working efficiency as compared with an operation for inserting the other members into the vertical hole. Further, the fact that the infrared ray source 103 is fastened in the inclined manner necessitates that its lead wire should be formed to be bent vertically upwards at the time of connecting the infrared ray source 103 to a power supply or the like (omitted from illustration). From this view point, the assembling work is troublesome. Further, the number of parts is too large to easily complete the assembling work. As a result, the conventional latent image reading apparatus has disadvantages of unsatisfactory assembling and mass productivity, resulting in a problem of high cost. In addition, the conventional latent image reading apparatus comprises the conductive member 107 as a necessary element. Therefore, a length L from the light receiving surface of the light detection device 105 to the latent image forming surface of the card 101 becomes long, and therefore, thickness of the apparatus becomes large.

Also a system for reading a non-visible latent image mark formed by printing a bar code or the like with ink made of fluorescent material is disclosed in Japanese Patent Application Laid-Open No. 1-211089 or Japanese Patent Application Laid-Open No. 53-9600.

FIG. 50 is a schematic view which illustrates a usual latent mark reading apparatus. As shown in FIG. 50, a latent image mark 401 including bar-shaped fluorescent members is printed on a sheet 400. The latent image mark 401 is sequentially read when the sheet 400 is passed through a conveyance passage A3.

That is, a light source 402 for exciting the latent image marks 401 to emit light is disposed on a light irradiation path B3. In front of the light source 402, a filer 403 for cutting visible components radiated from the light source 402 is disposed.

Further, a light receiving device 404 is disposed on a light emitting path C3, and a band pass filter 405 is disposed in front of the light receiving device 404 to receive only light emitted from the latent image mark 401.

In FIG. 50 a slit plate 406 is disposed between the filer 403 and band pass filter 406 and the paper conveyance passage A.

As shown in FIG. 51, a multiplicity of bar-shaped latent image marks 401 are printed on the sheet 400. By combining the number of the marks 401 within a predetermined area and intervals between marks 401, desired information can be formed.

In a case where the sheet 400 having the latent image marks 401 is passed through the sheet conveyance passage A, the light receiving device 404 transmits an output having a waveform, as shown in FIG. 52A. However, an end of the slit adjacent to the light source blocks the excited light, and therefore the light emitted from the latent image marks 401 cannot be sufficiently utilized. Therefore, if a width of the latent image mark 401 is narrowed, the output from the light receiving device 404 is reduced. As a result, an S/N may become too low to realize a satisfactory operation reliability.

In order to improve the apparatus, it might be considered feasible to bring the slit 406 closer to the latent image marks 401 or to bring the light receiving device 404 closer to the same. If the slit 406 is brought closer to the latent image mark 401, at a portion where the latent image marks 401 are positioned close to each other, the output is undesirably enlarged, as is designated by portions X3 shown in FIG. 52B, before the basic output is restored. If a pulse conversion in a slice level is performed, pulse width $P_{400}$ and pulse width $P_{401}$ become different from each other, as shown in FIG. 52C. In this case, information cannot correctly be read. If the predetermined area includes a larger quantity of information by narrowing the intervals between the latent image marks 401, the foregoing tendency becomes stronger, resulting in a long pulse to be formed depending on circumstances to lead to erroneous detection.

This disadvantageous phenomenon similarly takes place in a case where the light receiving device 404 is brought closer to the latent image marks 401.

On the other hand, in a case where a reflecting type structure is employed, the output from the light receiving device 404 is, if the slit width is narrower than the mark interval, restored to the base level as shown in FIG. 52D, even if the slit 406 is brought close to the latent image marks 401. However, since the reflecting type structure transmits a reverse output waveform to that of the light emission type structure, the waveform is reversed.

The reason why the waveform in a case where the fluorescent member is used is different from that in the case of the reflecting type structure is as follows. As shown in FIG. 53, excited light in the form of plane-emitted light, irradiates an area wider than the slit and the fluorescent member emits light uniformly in all directions. Since the light receiving device 404 also has a somewhat wide light receiving area, the device 404 can receive light also from a position designated by a dashed line shown in FIG. 53. Further, light reflected by the slit plate 406 and the sheet 400 may happen to reach the light receiving device 404. These are the cause of the phenomenon shown in FIG. 52B.

It should be noted that Japanese Patent Application No. 3-163694 (U.S. patent application Ser. No. 07/722,186 and European Patent Application No. 9108120), claiming priorities of Japanese Patent Application No. 2-173655, Japanese Patent Application No. 2-178207 and Japanese Patent Application No. 2-282881 have disclosed technologies, about a detection mark, a method of detecting the mark and a detection apparatus, for the purpose of stably detecting the shape of the mark formed on a card while maintaining an excellent measuring accuracy.

SUMMARY OF THE INVENTION

An object of the present invention is to overcome at least partially the foregoing problems experienced with the conventional technology.

More specifically, a first object of the present invention is to provide a latent image forming member which is capable of reliably reading information and which can be used for a long time.

A second object of the present invention is to provide a thin latent image reading apparatus which exhibits excellent assembling and mass-productivity.

A third object of the present invention is to provide an information recording medium and a system for reading the same, adaptable to reading a latent image using fluorescent material and capable of accurately reading the latent image mark while necessitating only a simple signal processing circuit.

According to the present invention, the first object can be realized by a latent image forming member comprising a base, and an information indication layer formed on the base, having a latent image pattern thereon, in which fluorescent grains are dispersed and held, so that the information indication layer is irradiated with light having a predetermined wavelength to excite the fluorescent grains and information of light emitted from the fluorescent grains is optically read, wherein reflectance of a surface of the base with respect to light having the predetermined wavelength is 20% or higher, a projection amount of the information display layer from a top surface of the base is restricted to a range of 0.5 to 20 µm, and a protection sheet is disposed which is laminated onto the base to cover over the entire information indication layer and which permits light having the predetermined wavelength to pass therethrough.

The term "information" in this specification includes, in its broadest sense, information representing truth/falseness by presence/absence of the latent image pattern (for example, presence of a certain latent image pattern represents "true" and absence of the same represents "false"). That is, the latent image pattern does not need to be coded. However, the following description is made taking a case of narrow sense of information in which the latent image pattern is coded in order to simplify the description.

In the present invention, as the light reflectance of the base adjacent to the information indication layer at a side thereof opposite a side on which excited light is incident is made to be 20% or higher, a part of the excitation light applied toward the information indication layer, directly impinges the fluorescent grains in the information indication layer to excite the fluorescent grains. Further, a part of the excitation light passes through the information display layer to be reflected by the surface of the base, the reflected light being allowed to impinge the fluorescent grains to excite the fluorescent grains. Therefore, the excitation of the fluorescent material can be performed efficiently.

Further, the arrangement that the projection amount T of the information indication layer is restricted to a range of 0.5 to 20 mm enables the light emission power (luminescent power) from the information indication layer to be obtained sufficiently. Further, the deformation (distortion due to sagging) of the latent image, such as the bar code, in the information indication layer can be prevented at the time of laminating the protection sheet. Therefore, information of the information indication layer can accurately be read.

Since the overall body of the information display layer is laminated by the protection sheet, various advantages such that excellent durability and chemical resistance can be attained and it can be used for a long time. Therefore, a highly reliable latent image forming member can be provided.

According to the present invention, the foregoing second object is partially achieved by a latent image reading apparatus comprising an insertion portion for an article in which a latent image is formed by a fluorescent substance which emits light when it is stimulated with infrared rays, an infrared ray source for irradiating the latent image formed surface of the article inserted into the insertion portion, and a light detection device for receiving the excited light from the latent image, wherein an infrared ray emitting diode is used as the infrared ray source, a photo-diode is used as the light detection device, and the infrared ray emitting diode and the photo-diode are disposed within an angular range of ±10 degrees or less from a normal direction of the latent image formed surface of the article inserted into the insertion portion.

The reading apparatus according to the present invention enables the elements (parts) to be assembled by simply inserting the elements into a substantially perpendicular hole. The bending work of the lead wires for electric parts can be omitted from the process. In addition, a light conductor and lens group can be omitted so that the number of the elements (parts) can be decreased. Therefore, the assemblability and the mass-productivity of the latent image reading apparatus can significantly be improved. Further, the capability of omitting the light conductor and the lens group enables a distance from the light receiving surface of the light detection device to the latent image formed surface to be shortened. As a result, thickness of the apparatus can be reduced.

In order to achieve the foregoing second object, the latent image reading apparatus according to the present invention preferably has an arrangement that the infrared ray emitting diode has a relative radiation intensity of 80% or higher of the radiation intensity of infrared rays emitted in the normal direction of the light emission surface at a direction (orientation) inclined from the normal direction of the light emission surface by 35 degrees, and the photo-diode has an 80% or higher relative light receiving sensitivity for light incident in a direction inclined by 15 degrees from the normal direction of the light receiving surface with respect to the light receiving sensitivity for light incident in the normal direction of the light receiving surface.

If the infrared ray emitting diode exhibiting a low directivity is used, a wide range of the latent image formed surface can be irradiated with strong infrared rays which is not limited to the normal direction of the light emission surface. If a photo-diode having a low directivity is used, excited light from the latent image can be received from a wide range including the normal direction of the light receiving surface and directions around the normal direction. Therefore, the necessity of making the respective elements to be inclined as having been required in the conventional technology using the high-directivity infrared ray emitting diode and photo-diode can be eliminated. As a result, the elements can be disposed in parallel to the normal direction of the latent image formed surface. If a photo-diode having an excessively low directivity is used, for example, if a photo-diode having a relative light receiving sensitivity of 80% or more for light incident in a direction inclined by 45 degrees from the normal direction of the light receiving surface is used, the regular reflection component become too large, resulting in a decrease of the S/N. Therefore, it is preferable that the directivity be higher than the foregoing level. In the case where the infrared ray emitting diode and the photo-diode having the characteristics and employed in the foregoing means have been disposed in parallel to the normal direction of the latent image formed surface, a reading signal level equivalent to the conventional technology has been obtained experimentally. Further, even if a mounting error takes place by about ±10 degrees from the normal direction of the latent image formed surface, a practically sufficient high reading signal level has been obtained.

Another object of the present invention is to provide an optical reading apparatus exhibiting excellent reading reliability. The foregoing object can be realized by a first embodiment of an optical reading apparatus comprising an optical head body having a reading opening portion therein, a slit sheet having a slit-shaped light transmissive portion and disposed adjacent to the reading opening portion of the optical head body, a light emitting device for emitting light toward an object to be detected through the light transmissive portion of the slit sheet and the reading opening portion of the optical head body and a light receiving device for receiving light from the object to be detected through the reading opening of the optical head body and the light transmissive portion of the slit sheet, wherein a sheet pressing member made of opaque material is disposed to press the slit sheet against a portion in the vicinity of the reading opening portion on an inside of the optical head body, the sheet pressing member has a light restriction hole corresponding to the light transmissive portion of the slit sheet, the other side of the light restriction hole corresponds to the light emitting portion of the light emitting device and the light receiving portion of the light receiving device, and a portion in the vicinity of the light transmissive portion of the slit sheet is covered by one end face of the sheet pressing member.

The foregoing object is further achieved by a second embodiment, arranged in such a manner that another end face of the sheet pressing member covers an end surface of the light emitting device except for the light emitting portion and an end surface of the light receiving device, except for the light receiving portion.

The foregoing object is achieved by a third embodiment arranged in such a manner that the sheet pressing member also serves as a device holder for holding the light emitting device and the light receiving device.

The foregoing object is further achieved by a fourth embodiment arranged in such a manner that the slit sheet is composed of a transparent base film and an opaque layer printed on the surface of the base film, and a portion in which no opaque layer is printed is made to be the light transmissive portion.

The foregoing object is further achieved by a fifth embodiment arranged in such a manner that the object to be detected has a fluorescent mark.

Since the first embodiment is arranged in such a manner that the portion including the light transmissive portion of the slit sheet is covered by one end face of the sheet pressing member, light reflected from the foregoing portion can be eliminated. Therefore, the S/N can be improved as compared with that obtainable from the conventional structure, and therefore, the reading reliability can be improved.

Since the second embodiment is arranged in such a manner that the other end face of the sheet pressing member covers the end surfaces of the light emitting device and light receiving device except for the light emitting portion and light receiving portion, the reading reliability can further be improved.

Since the third embodiment is arranged in such a manner that the sheet pressing member also serves as the device holder for holding the light emitting device and the light receiving device, the number of elements (parts) of the whole apparatus can be decreased, the assembling process can be simplified, and the size and the cost can be reduced.

Since the fourth embodiment is arranged in such a manner that the portion of the slit sheet except for the light transmissive portion is made of the opaque layer, the light reflection prevention effect in the foregoing portion can further be improved. Further, air tightness can be maintained.

The fifth embodiment enables the non-visible fluorescent mark to be accurately read.

According to the present invention, the foregoing third object can be achieved by an information recording medium with latent image marks comprising a base, and a multiplicity of the latent image marks formed on the base and containing fluorescent substance wherein the latent image marks are adapted to emit lights, when the marks are irradiated with light having a predetermined wavelength, a portion of the light emitted from the latent image mark that is emitted immediately after the irradiation light has been shielded being so that an interval and number of the latent image marks are detected, wherein a ratio (f/a), with respect to a width (a) of the latent image mark in a direction in which the latent image mark is read, of an interval (f) between the latent image marks in the reading direction is 1.4 or higher.

In addition, according to the present invention, the foregoing third object can be achieved by a system for reading an information recording medium with latent image marks, comprising:

an information recording medium in which a multiplicity of the bar-shaped latent image marks each containing fluorescent substance and having its longitudinal direction in a direction perpendicular to a reading direction are formed on a base thereof, information being constituted by an interval and number of the latent image marks;

a latent image mark reading apparatus having a light source for irradiating the latent image mark with light having a predetermined wavelength, a light receiving device which receives light emitted from the latent image mark when the latent image mark is irradiated with light and which is disposed with respect to the light source in a direction substantially in parallel to the longitudinal direction of the latent image mark, and a slit plate disposed between the information recording medium and the light source and light receiving device, and having a light transmissive portion extending substantially in parallel to the longitudinal direction of the latent image mark, wherein the latent image mark is irradiated with light emitted from the light source and a portion, of excited light emitted from the latent image mark, that is emitted immediately after the irradiation light has been shielded is received by the light receiving device to detect the interval and the number of the latent image marks, wherein a ratio (f/a), with respect to a width (a) of the latent image mark in a direction in which the latent image mark is read, of an interval (f), between the latent image marks in the reading direction, is restricted to be 1.4 or higher, and a ratio (e/a) of a width (e) of the light transmissive portion in the reading direction of the latent image mark with respect to the width (a) of the fluorescent mark in the reading direction is restricted to a range of 0.6 to 1.4.

Further, according to the present invention, the foregoing third object can be achieved by a system for reading an information recording medium with latent image marks, comprising an information recording medium in which a multiplicity of the bar-shaped latent image marks each containing fluorescent substance, having its longitudinal direction in a direction perpendicular to a reading direction are formed on a base thereof, the information being constituted by an interval and number of the latent image marks, and a latent image mark reading apparatus having a light source for irradiating the latent image mark with light having a predetermined wavelength, a light receiving device which receives light emitted from the latent image mark when the latent image mark irradiated with light and which is disposed with respect to the light source in a direction substantially in parallel to the longitudinal direction of the latent image mark, and a slit plate disposed between the information recording medium and the light source and light receiving device, and having a light transmissive portion extending substantially in parallel to the longitudinal direction of the latent image mark, wherein the latent image mark is irradiated with light emitted from the light source and a portion of light emitted from the latent image mark, that is emitted immediately after the irradiation light has been shielded, is received by the light receiving device to detect the interval and the number of the latent image marks, wherein a ratio (f/a), with respect to a width (a) of the latent image mark in a direction in which the latent image mark is read, of a interval (f) between the latent image marks in the reading direction is restricted to be 1.4 or higher, a ratio (e/a) of a width (e) of the light transmissive portion in the reading direction with respect to the width (a) of the latent image mark is restricted to a range of 0.6 to 1.4, and a ratio (b/d) of an interval (b) between the slit plate and the latent image mark with respect to an interval (d) between one of the light source and the light receiving device that is more adjacent to the latent image mark and the latent image mark is restricted to a range of 0.03 to 0.3.

As described above, since the present invention is arranged to restrict the ratio (f/a) of the interval (f) between the latent image marks in the reading direction with respect to the width (a) of the latent image mark in the reading direction, the ratio (e/a) of the width (e) of the light transmissive portion in the reading direction with respect to the width (a) of the latent image mark, and the ratio (b/d) of the interval (b) between the slit plate and the latent image mark and the interval (d) between one of the light source and the light receiving device that is more adjacent to the latent image mark, and the latent image mark, good S/N can be obtained and a signal without change in the pulse width can be obtained. Therefore, the latent image mark can be adequately read while eliminating the necessity of using the complicated conversion circuit. Consequently, the cost can be reduced.

The foregoing and other objects, features and advantages of the invention will be made clearer from the following description with reference to the drawings without necessarily limiting the scope of the present invention.

BRIEF DESCRIPTION OF DRAWINGS

FIG. 43 is a schematic structural view of a card reader/writer according to an embodiment of the present invention;

DETAILED DISCUSSION

Figure 1:
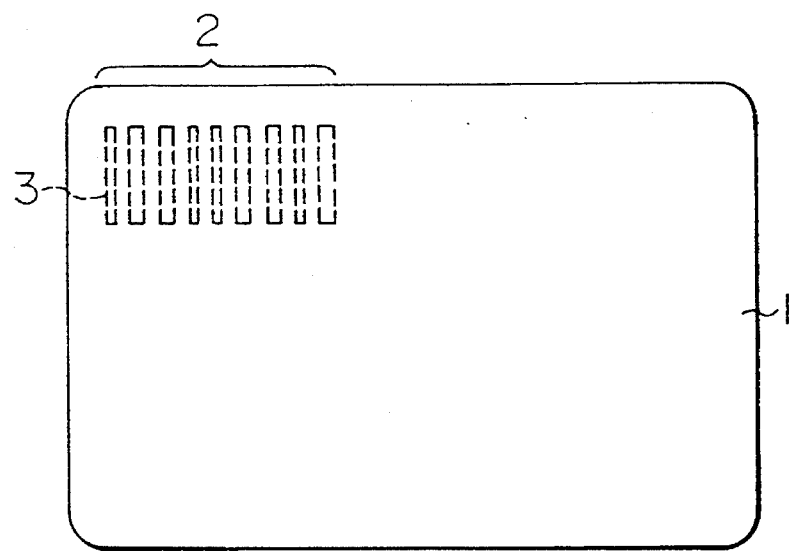
FIG. 1 is A plan view which illustrates an ID card according to a first embodiment of the present invention.
Figure 3:
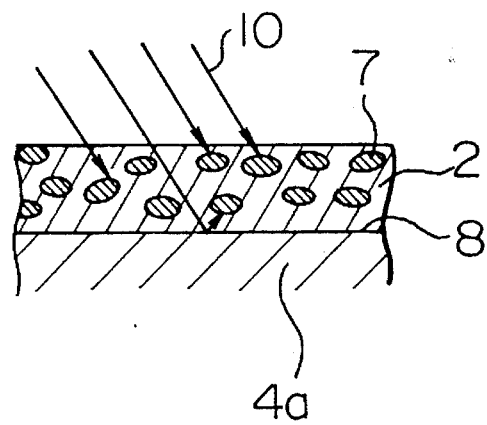
FIG. 3 is an enlarged sectional view of an information indication layer of the ID card.
Figure 4:
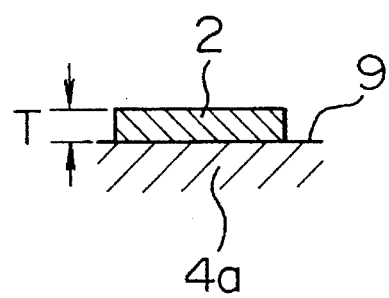
FIG. 4 is a view which illustrates a projection amount of the information indication layer.

Preferred embodiments of the present invention will now be described. FIG. 1 is a plan view of an ID card serving as a latent image forming member according to a first embodiment, FIG. 2 is an enlarged sectional view of the ID card, FIG. 3 is an enlarged sectional view of an information indication layer of the ID card, and FIG. 4 is a view which illustrates an amount of projection of the information indication layer.

The ID card 1 according to this embodiment has an information indication layer 2 at a predetermined position as shown in FIG. 1, the information indication layer 2 having a bar code 3 serving as a non-visible latent image pattern.

Figure 2:
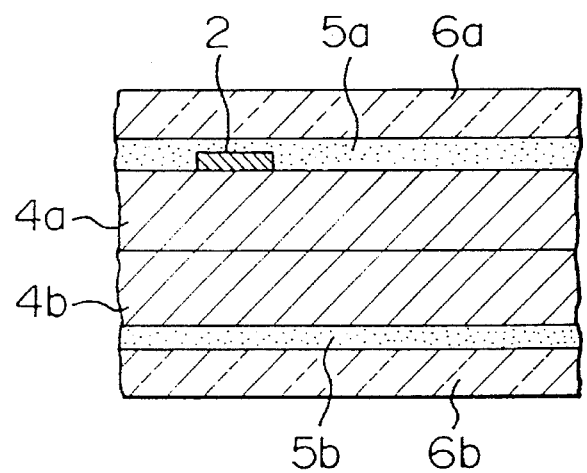
FIG. 2 is an enlarged cross sectional view of the ID card.

An internal structure of the ID card 1, as shown in FIG. 2, comprises, bases 4a and 4b, the information indication layer 2 formed on the same by printing, non-solvent type adhesive agent layers 5a and 5b made of materials such as hot-melt type adhesive agent and protection sheets 6a and 6b, in the form of an integrally stacked structure.

In the case of this embodiment, the information indication layer 2 is, by printing, formed on the opaque base 4a having a flat surface. The opaque base 4a is made of a vinyl chloride type resin sheet in which white pigment, such as titanium oxide, is dispersed and held. The base 4b may be opaque or transparent. It is preferable that the thickness of each of the bases 4a and 4b is about 300 µm. By using a member formed by bonding the two relatively thick bases 4a and 4b, printing of the information indication layer 2 can be performed satisfactorily. If the base is relatively thick, quality of the printed information indication layer 2 is unsatisfactory.

The information indication layer 2, as shown in FIG. 3, comprises fluorescent grains 7 which are excited when irradiated with, for example, infrared rays 6, and transparent binder 8 for dispersing and holding the fluorescent grains 7. As the fluorescent grains 7, an organic compound such as dye named rhodamine 6 G, thioflavine or eosin, or an inorganic compound such as $NdP_5O_{14}$, $LiNdP_4O_{12}$ or $Al_3Nd(BO_3)_4$ may be employed. It is preferable that the average grain size of the fluorescent grains 7 is about 0.5 to 2 µm.

As the binder 8, a mixture of, for example, wax, vinyl chloride-vinyl acetate copolymer, ethylene-vinyl acetate copolymer, polyester, polyurethane and carbonate is used. If necessary, additives such as a plasticizer and a surface active agent are included in adequate quantities.

It is appropriate to make a content of the fluorescent grains 7 in the information indication layer 2 to be ranged from 50 to 80 wt %. It is 75 wt % in this embodiment. If the content of the fluorescent grains 7 is less than 50 wt %, the output from the information indication layer 2 is too weak. If the content exceeds 80 wt %, there arises a risk of defective printing at the time of printing the information indication layer 2.

A softening point of the information indication layer 2 is adjusted to range from a temperature lower, by about 40° C., than a temperature at which the base 4a and the protection sheet 6a are laminated to each other to a temperature higher, by about 10° C., than the same. Specifically, the softening point of the information indication layer 2 is 80° C. or higher, preferably 80° C. to 105° C. If the temperature is lower than 80° C., the shape of the bar code 3 is likely to be distorted (deformed) due to the temperature at which the base 4a and the protection sheet 6a are laminated to each other. If the softening point of the information indication layer 2 exceeds 105° C., the thermal head consumes excessively large electric power at the time of printing the bar code 3. What is worse, a life of the thermal head will be shortened or there arise a risk that the bar code 3 cannot be adequately printed.

In this embodiment, an ink ribbon was used which was manufactured by forming a thermal transfer recording layer (softening point 89° C.) of a thickness of 2.5 µm formed by a mixture of 76 parts by weight of $NdP_5O_{14}$ serving as the fluorescent member with 12 parts by weight of tepoly urethane (UR-8200 manufactured by Toyobo Co., Ltd.) and 12 parts by weight of polycarbonate (S-8200 manufactured by Asahi Glass Co., Ltd.) serving as the binder on a base film made of a 4.5 μm-thick polyethylene terephthalate film. The ink ribbon is fastened to the thermal head to print individual bar bodes 3 on the base 4 (the base 4a and the base 4b are integrated) by a thermal transfer process.

When the infrared rays 10 having a center wavelength adaptable to the excitation wavelength of the employed fluorescent member are applied to the information indication layer 2 as shown in FIG. 3, the fluorescent grains 7 receive the infrared rays 10 and are excited to emit light. In order to efficiently excite the fluorescent grains 7, the light reflectance of the base 4a is made to be 20% or more. That is, by the base 4a of the high reflectance, the infrared rays 10 are reflected on the surface of the base 4a as shown in FIG. 3 to enhance excitation of the fluorescent grains 7. By adding the white pigment to the base 4a as described above, the reflectance of the base 4a can be raised. In this embodiment, the base 4a having a reflectance of 80% is used. If the reflectance is lower than 20%, the excitation of the fluorescent grains 7 cannot be efficiently performed. Therefore, the light emission power from the information indication layer 2 is unsatisfactory with respect to a supplied energy of the infrared rays 10. Therefore, the light reflectance of the base 4a adjacent to the information display layer 2 and opposite the excited light-incident side should be 20% or higher.

Next, Table 1 shows results of measurements performed in such a manner that samples each of which was manufactured by forming the information indication layer having a thickness of 4 μm on the 5.5 cm (length)×8.5 cm (width) base of a thickness of 188 μm containing various proportion (contents) of white pigment to provide various the reflectances of the base were used to measure an output voltage and an S/N (ratio of a signal output (S) to a noise output (N)) after the light emission power from the information indication layer 2 has been converted photo-voltaically.

As the measuring apparatus, an infrared ray emitting diode TLN201 (a GaAlAs infrared ray emitting diode having a center wavelength of 880 nm) manufactured by Toshiba Corp. was used in this case. The infrared rays from the light emitting diode were irradiated normally on the information indication layer through an optical fiber (having a diameter of 1 mm). Light from the information indication layer was passed through a film made of InP having a thickness of 0.3 mm by way of an optical fiber (having a diameter of 1.2 mm) to be received by photo-diode TPS703 (a light receiving device made of silicon) manufactured by Toshiba Corp.

TABLE 1

Relationship Between Reflectance of Base and Output

| Reflectance of Base (%) | Output Voltage (mV) | S/N |
|---|---|---|
| 2 | 23 | 1.10 |
| 5 | 36 | 1.25 |
| 20 | 61 | 1.61 |
| 30 | 77 | 1.83 |
| 50 | 120 | 2.51 |
| 60 | 130 | 2.93 |
| 80 | 580 | 3.60 |

As apparent from Table 1, if the reflectance of the base is less than 20%, the S/N is low and the output voltage cannot be satisfactorily high. Therefore, information cannot be accurately read. If the reflectance of the base is 20% or higher, preferably 50% or higher, a satisfactory S/N and output voltage can be obtained to read information correctly.

As shown in FIG. 4, a projection amount T (which corresponds to the thickness of the information indication layer 2 in this embodiment) of the information indication layer 2 from a top surface 9 of the base 4a in a region where the information indication layer 2 is not formed is restricted to range from 0.5 to 20 μm, preferably from 1 to 10 μm. If the projection amount T is less than 0.5 μm, a quantity of the fluorescent substance is insufficient and the light emission power from the information display layer 2 is too weak to correctly read information of the bar code 3. If the projection amount T exceeds 20 μm, deformation (shape-distortion occurring due to sagging) of the bar code 3 upon laminating the protection sheet 6a becomes significant. Therefore, information of the bar code 3 cannot be accurately read. Because of the foregoing reasons, the projection amount T should be restricted to range from 0.5 to 20 μm.

Figure 11:
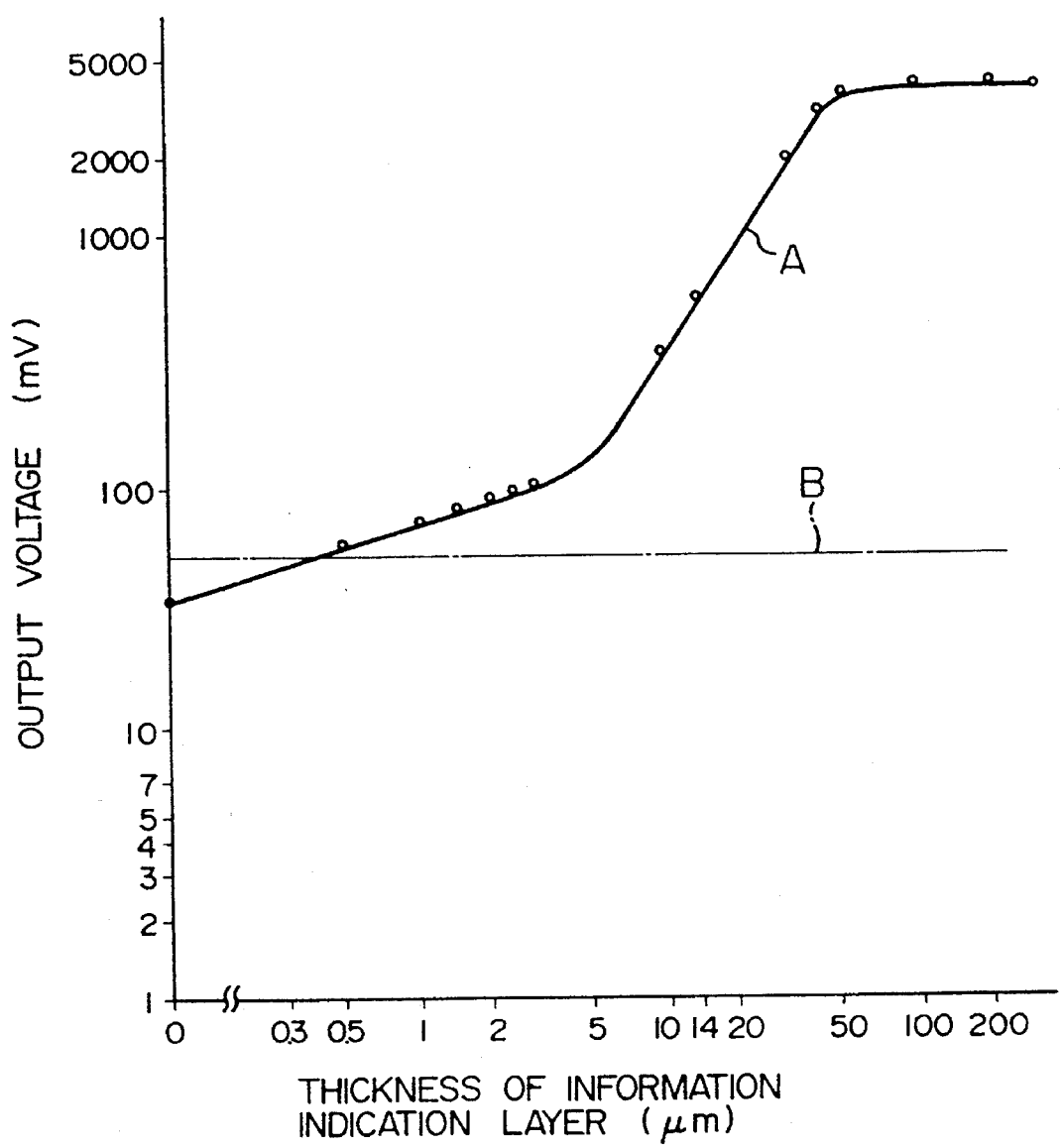
FIG. 11 is a characteristic graph which illustrates the relationship between the information indication layer and output voltage.

FIG. 11 is a characteristic graph for illustrating technical basis of the lower limit of the projection amount T (the thickness of the information indication layer 2) of the information indication layer 2, in which the abscissa stands for the thickness of the information indication layer 2 and the ordinate stands for the output voltage after photo-voltaic conversion of the light emission power from the information display layer 2. Curve A shown in FIG. 11 is a characteristic curve showing the relationship between the thickness of the information indication layer 2 and the output voltage when the information indication layer 2 is formed on the surface of the base containing the white pigment as described above. Line B is a straight line showing the output level sy which the output from the information indication layer 2 is 1.6 times the output voltage from only the base (average light reflectance in a visible ray region is 80%) containing the white pigment.

As a result of various experiments carried out by the inventors of the present invention, if the output voltage from the information indication layer 2 is lower than 1.6 times of the output voltage from only the base, the bar code formed by the information indication layer 2 cannot be read fully. Therefore, the output voltage from the information indication layer 2 should be 1.6 times or more that from only the base. The minimum thickness of the information indication layer 2 at this value is 0.5 μm as can be apparent from the graph. Although the output voltage is increased according to an increase in the thickness of the information indication layer 2, it becomes substantially constant when the thickness of the information indication layer 2 reaches about 50 μm.

As the adhesive agent layers 5a and 5b, a hot-melt type adhesive agent such as an ethylene-vinyl acetate copolymer, polyethylene, polyamide or polyester is used. In particular, it is preferable to use a hot-melt type adhesive agent having slight adhesiveness. If the adhesive agent layer 5a is a solvent type agent, there is a risk that residual solvent is transferred to the information indication layer 2 to cause the deformation of the bar code 3 or the like due to swelling or dissolution. Therefore, at least the adhesive agent layer 5a in contact with the information indication layer 2 should be a non-solvent type agent.

The protection sheets 6a and 6b are made of transparent synthetic resin sheets each having a thickness of about 50 to 150 μm. Although 80 μm vinyl chloride resin sheets are employed in this embodiment, the sheets may be made of polyethylene terephthalate type resin, polypropylene, polycarbonate or acrylic resin. The thickness of the protection sheet 6a is not particularly limited so far as the thickness is large enough to protect the information indication layer 2.

Figure 5:
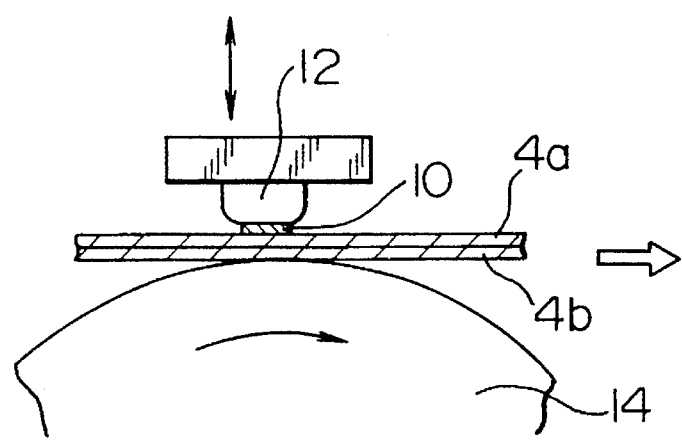
FIG. 5 is a view which illustrates a process for forming the information indication layer on a base of the ID card.

FIG. 5 is a view for illustrating a process for forming the information indication layer 2 on the base 4. A bonded member 4 formed by bonding the base 4a and the base 4b is inserted into between an ink ribbon 10 made of the base film having thereon the thermal transfer recording layer containing therein the fluorescent substance and a platen roller 14. Disposition made so that the thermal transfer recording layer of the ink ribbon 10 faces the bonded member 4, so that a peculiar bar code is thermally transferred to a predetermined position of the base 4a by the thermal head 12.

It is preferable that the thickness of the thermal transfer recording layer is 1 to 4 μm, more preferably a range of 1.5 to 2.5 μm. If the thickness of the thermal transfer recording layer is less than 1 μm, the power from the formed information indication layer 2 is too weak to adequately read the information. If the thickness of the thermal transfer recording layer exceeds 4 μm, the bar code cannot be satisfactorily printed. A coloring material such as pigment may be added to the thermal transfer recording layer.

Figure 6:
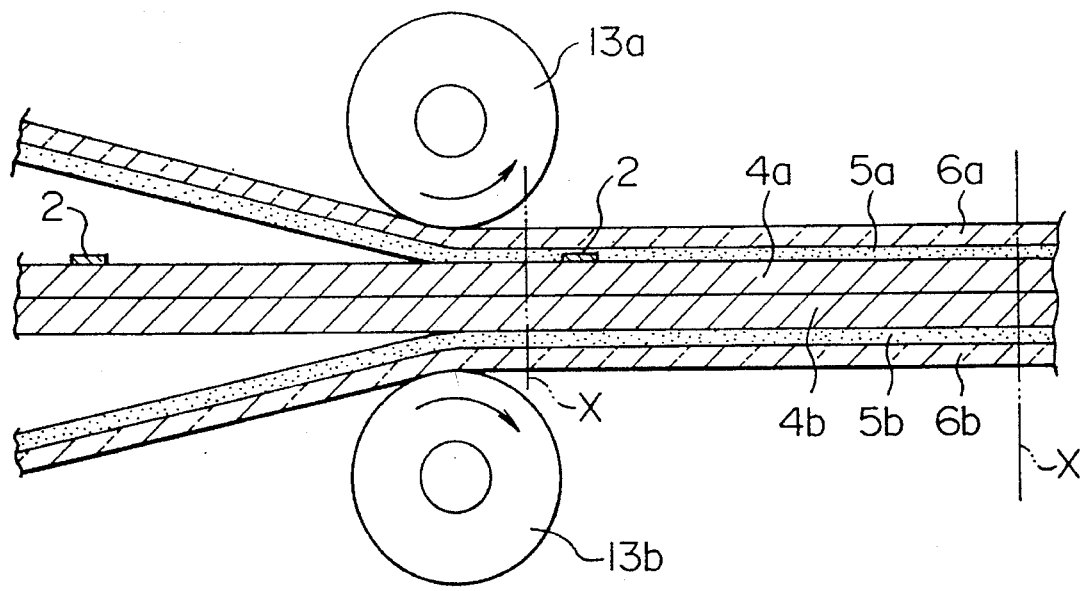
FIG. 6 is a view which illustrates a process for bonding the base, on which the information indication layer has been formed, and a protection sheet to each other.

FIG. 6 is a view for illustrating a process for bonding the bases 4a and 4b having the information indication layer 2 formed thereon with the protection sheets 6a and 6b to one another. Web-like protection sheets 6a and 6b having the adhesive agent layers 5a and 5b are respectively stacked on upper and lower surfaces of a web-like member made by forming the information indication layers 2 with intervals on predetermined positions of the bonded member 4 of the base 4a and the base 4b as having been described with reference to FIG. 5. They are pressed by rollers 13a and 13b to be temporarily integral followed by being subjected to to a press machine to be heated and pressed at 120° C. for 20 minutes. As a result, the bases 4a, 4b, the protection sheets 6a and 6b are fused to each other. Then, the thus bonded member is cooled, and then it is sequentially cut along a line X so that ID cards each having a predetermined size and shape are obtained.

Figure 7:
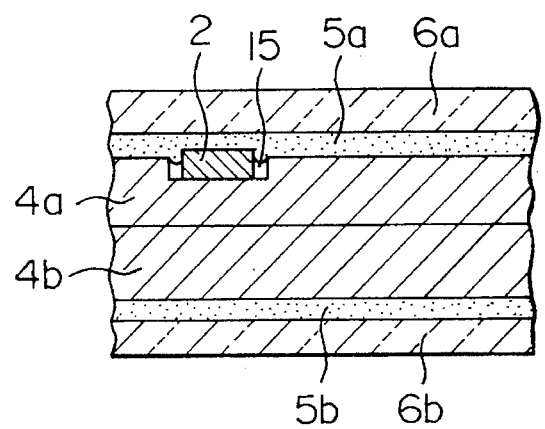
FIG. 7 is an enlarged sectional view of an ID card according to a second embodiment of the present invention.
Figure 8:
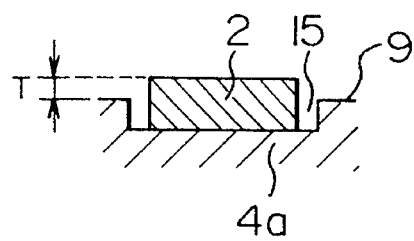
FIG. 8 is a view which illustrates the projection amount of the information indication layer of the ID card.

FIGS. 7 and 8 are views which illustrate a second embodiment of the present invention. The second embodiment differs from the first embodiment in that a recessed portion 15, which is a little wider than the information of the base 4a layer 2, is formed beforehand by a work such as an embossing work in a position of the base 4a at which the information indication layer 2 is to be provided. The information indication layer 2 is printed into the recessed portion 15 by thermal transfer.

Thus, the distance from the top surface 9 of the base 4a that has not the recessed portion 15 to the top surface of the information indication layer 2 is the projection amount T in the case of this embodiment, the projection amount T being restricted to range from 0.5 to 20 μm, preferable from 1 to 10 μm.

If the recessed portion 15 is formed in the base 4a and the information indication layer 2 is formed in the recessed portion 15 as is done in this embodiment, he substantial thickness of the information indication layer 2 can be thickened while preventing the excessive increase in the projection amount T of the information indication layer 2 so that the output (power) can be increased.

Figure 9:
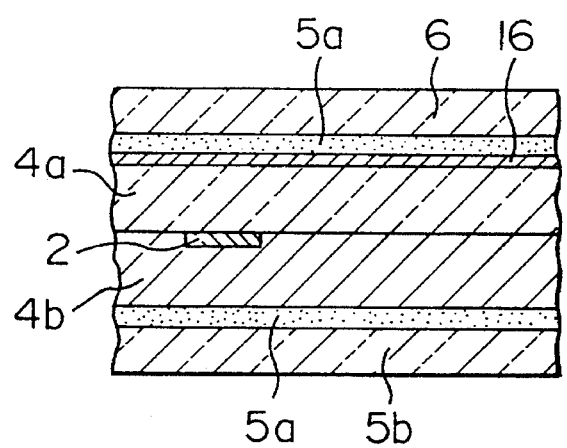
FIG. 9 is an enlarged sectional view of an ID card according to a third embodiment of the present invention.

FIG. 9 is a view which illustrates a third embodiment of the present invention. In the case of this embodiment, the base 4a is also made of a transparent sheet similarly to the protection sheet 6a. The information indication layer 2 is, by thermal transfer, printed on to the lower surface of the base 4a. The base 4b and the base 4a each having the light reflectance of 20% or higher are bonded to each other with or without an adhesive agent layer therebetween.

Also in this embodiment, the projection amount T from the lower surface of the base 4a to the lower surface of the information indication layer 2 is restricted to range from 0.5 to 20 μm, preferable from 1 to 10 μm. In this embodiment, a printed layer 16 for hiding the information indication layer 2 (the bar code 3) is formed on the top surface of the base 4a. Although the printed layer 16 according to this embodiment is formed by a paint containing a soluble-type ink solvent and a coloring pigment, ultraviolet-curing ink may be used in place of the soluble-type solvent ink.

Figure 10:
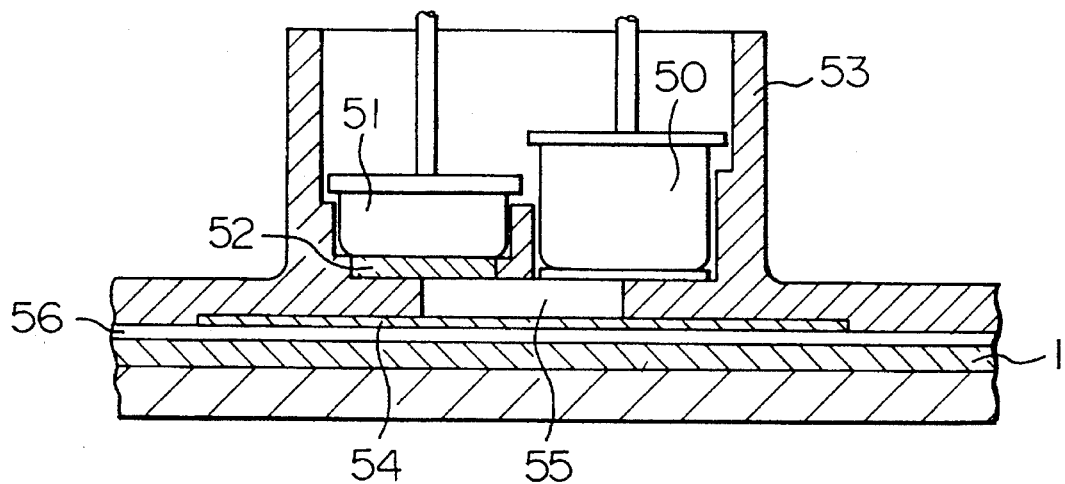
FIG. 10 is a sectional view which illustrates an apparatus for reading the ID card.

FIG. 10 is a sectional view which illustrates a reading apparatus for optically reading the bar code (a latent image pattern) of the information indication layer of the ID card according to each of the foregoing embodiments. Reference numeral 1, shown in FIG. 10, represents the ID card described in each of the foregoing embodiments, 50 represents an infrared ray emission source incorporating therein an infrared ray emitting diode, 51 represents a light detection device made of a photo-diode, 52 represents a filter that permits only light from the bar code (the latent image pattern) to pass therethrough, and 53 represents a holder for holding elements such as the infrared ray emission source 50, the light detection device 51 and the filter 52. Reference numeral 54 represents a slit plate fastened to an opening portion 55 of the holder 53, and 56 represents a card conveyance passage.

When the ID card 1 is inserted into the card conveyance passage 56 in a state where a side of the card 1 having the information indication layer faces upwards, infrared ray emitted from the infrared ray emission source 50 is applied to the foregoing information indication layer. As a result, the fluorescent grains dispersed and held in the information indication layer are excited, to emit light, so that the emitted light is received by the light detection device 51 by way of the slit plate 54 and the filter 52. Therefore, information of the information indication layer is optically read by the light detection device 51.

The detailed description about the reading apparatus will be made later further in detail with reference to FIGS. 12 and 13.

Although each of the foregoing embodiments has the arrangement that the light reflectance of the base is made to be 20% or higher by adding the white pigment or the like, the present invention is not limited to this. For example, a metal film made of aluminum or the like may be deposited on the surface of the base adjacent to the information indication layer 2 by vacuum evaporation or sputtering to make the light reflectance of the base to be 20% or higher.

Although the foregoing embodiments comprise the bonded member of the two bases, one relatively-thick base may be used.

Although the foregoing embodiments has the arrangement that the bar code 3 is formed in the information indication layer 2, the present invention is not limited to this. For example, an information indication layer may include symbols, such as characters, or dots.

Although the foregoing embodiments have been described about the card-shaped latent image forming member, the present invention is not limited to this. For example, the latent image forming member may be formed into another shape, such as a coin-like shape, a seal-like shape or a bar-like shape.

As described above, the present invention has the arrangement that the light reflectance of the base adjacent to the information indication layer at the side thereof opposite to the side on which excited light is incident is made to be 20% or higher, a part of excitation light applied to the information indication layer impinges directly on the fluorescent grains in the information indication layer to excite the fluorescent grains, while a part of the excitation light transmits through the information indication layer, and is then reflected by the surface of the base. Reflected light from the surface impinges on the fluorescent grains to excite the fluorescent grains. Therefore, the excitation of the fluorescent member can efficiently be performed.

Since the projection amount T of the information indication layer is restricted to range from 0.5 to 20 μm, a sufficiently high light emission power can be obtained from the information indication layer. Further, there is not a possibility that the latent image, such as the bar code of the information indication layer, is distorted (deformed due to sagging) at the time of laminating the protection sheet. As a result, information of the information indication layer can accurately be read.

since the overall body of the information indication layer is laminated over by the protection sheet, various advantages such as excellent durability chemical resistance and capability of being used for a long time are attained. Therefore, a reliable latent image forming member can be provided. By forming on the base the information indication layer having the latent image pattern by printing thereon the fluorescent paint containing the fluorescent grains and by applying the protection sheet having the hot-melt adhesive agent layer on one side thereof to the base to cover the overall body of the information indication layer to fuse the base and the protection sheet to each other with the hot-melt adhesive agent layer therebetween, the deformation of the latent image pattern due to swelling and dissolution can be prevented while obtaining high manufacturing efficiency.

Figure 14:
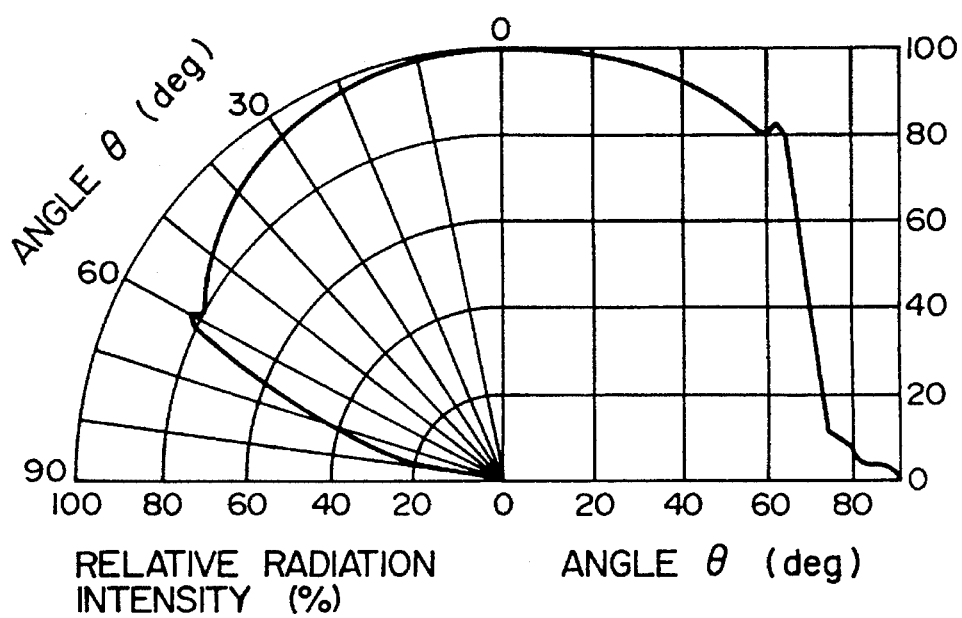
FIG. 14 is a characteristic diagram which shows the radiation directivity of an infrared ray emitting diode applied to an embodiment.
Figure 15:
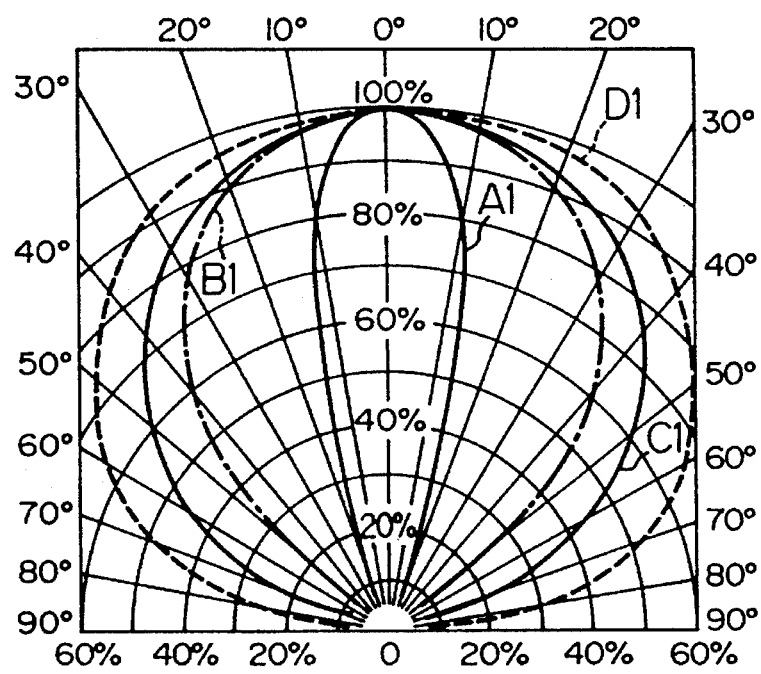
FIG. 15 is a characteristic diagram which shows the radiation directivity of various photo-diodes.
Figure 16:
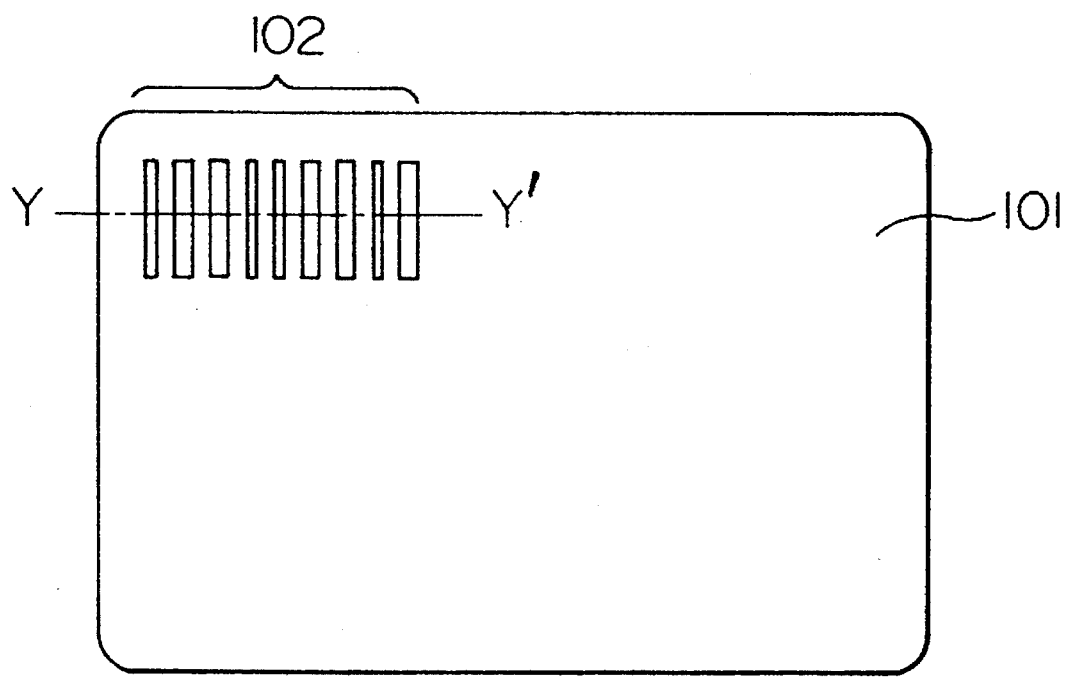
FIG. 16 is a plan view which illustrates a card applied to an embodiment.

An embodiment of the present invention to achieve a second object of the present invention will now be described with reference to FIGS. 12 to 16. FIG. 12 is a sectional view of an essential portion of an apparatus for reading the latent image according to this embodiment. FIG. 13 is a sectional view taken along line XIII—XIII of FIG. 12. FIG. 14 is a diagram which illustrates the radiation directivity characteristics of an infrared ray emitting diode applied to this embodiment. FIG. 15 is a diagram which illustrates the radiation directivity characteristics of various photodiodes. FIG. 16 is a plan view of a card applied to this embodiment.

Figure 17:
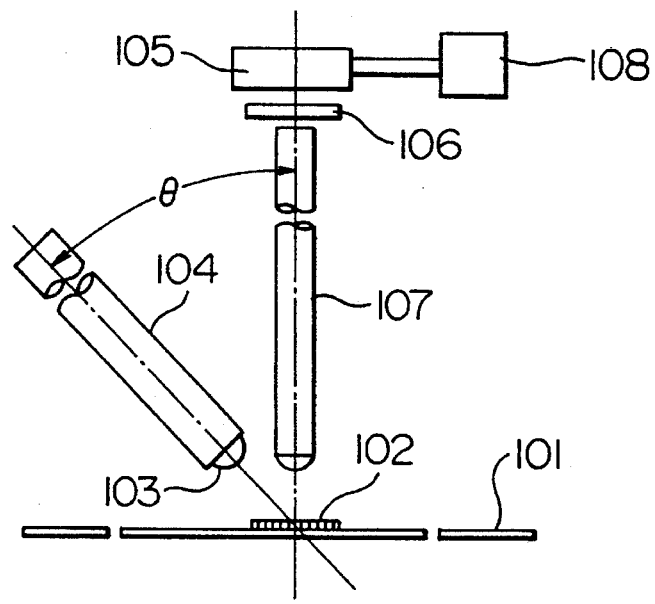
FIG. 17 is a view which illustrates a conventional apparatus for reading a latent image.
Figure 18:
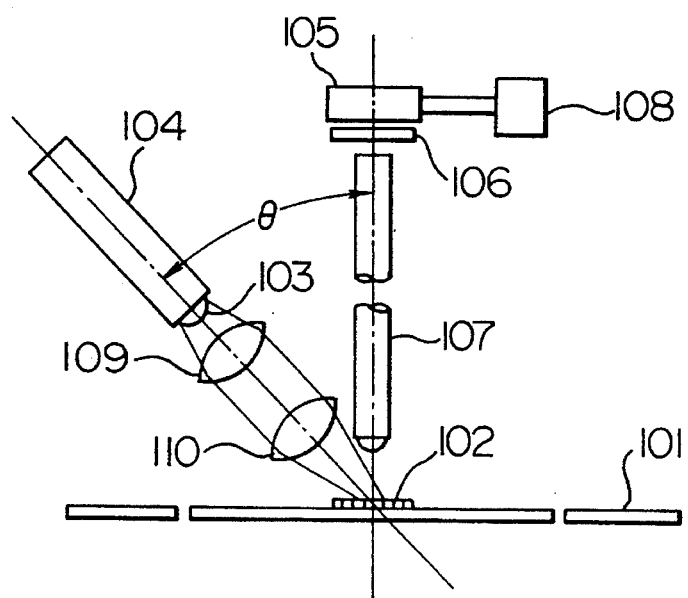
FIG. 18 is a view which illustrates another example of the conventional apparatus for reading the latent image.

Referring to the drawings, there is seen a mold 111, a card insertion portion 112, a hole for mounting the infrared ray emitting diode 113, a hole for mounting the photo-diode 114, a filter setting portion 115, a through hole 116, a slit plate setting portion 117, a slit plate 118, and a slit 119 formed in the slit plate 118. Residual elements corresponding to those shown in FIGS. 17 and 18 are given the same reference numerals.

Figure 12:
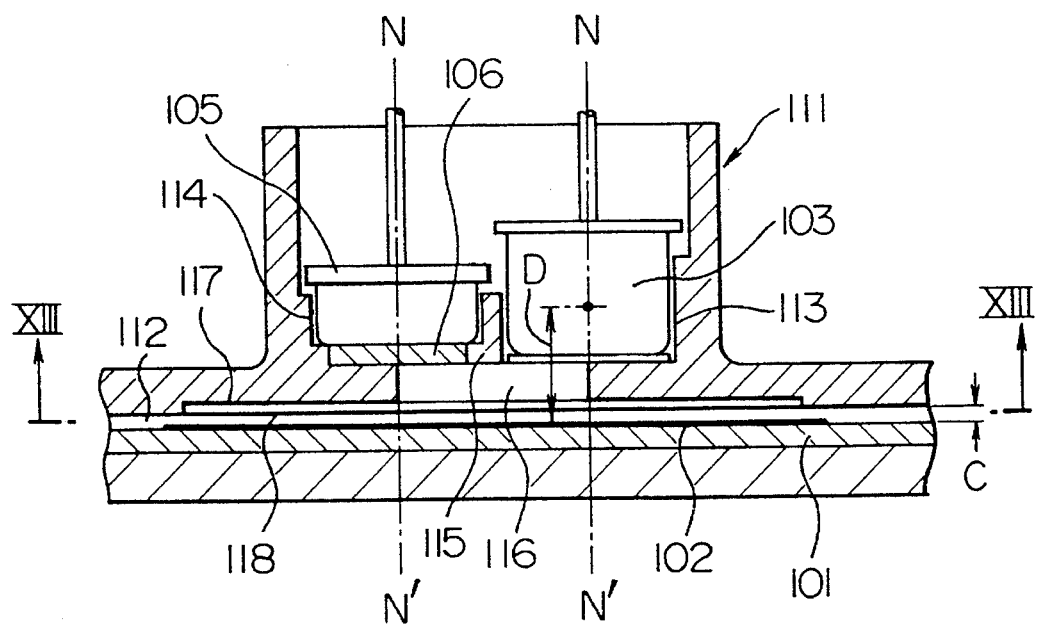
FIG. 12 is a sectional view which illustrates an essential portion of an apparatus for reading the latent image according to an embodiment.

As shown in FIG. 12, the mold 111 comprises integrally the card insertion portion 112 through which a card 101 having a predetermined shape as exemplified in FIG. 16 and a latent image formed therein is inserted as desired, the hole 113 for mounting therein the infrared ray emitting diode 103, the hole 114 for mounting therein the photo-diode 103, the portion 115 for setting a filter 106, the through hole 116 communicated with the mounting holes 113 and 114, and the portion 117 for setting the slit plate. The mounting hole 113 for the infrared ray emitting diode 103 and the mounting hole 114 for the photo-diode 105 are opened to extend parallel to each other in normal direction N–N' with respect to the top surface (the surface of the card 101 in which the latent image 102 is formed) of the card insertion portion 112. The mounting holes 113 and 114 respectively and selectively receive therein the infrared ray emitting diode 103 and the photo-diode 105. The mounting holes 113 and 114 do not need to be formed in the structly normal direction N–N' but may be mounted in the direction with an error of a degree less than 10±degrees. The mounting holes 113 and 114 and the through hole 116 are, of course, located on a passage through which substantially the central portion (portion Y–Y' shown in FIG. 16) of the latent image 102 passes when the card 101 is inserted into the card insertion portion 112 in a predetermined direction (orientation).

The infrared ray emitting diode 103 to be employed has a relative radiation intensity of 80% or more at a direction (orientation) inclined by 60 degrees from the normal direction assuming that the normal direction of the light emission surface is zero degree and the radiation intensity of infrared rays to be emitted in the normal direction is 100% as shown in FIG. 14. The infrared ray emitting diode of the type having such radiation directivity characteristics is exemplified by a 0.8 μm band infrared ray emitting diode HE8807SG having a GaAlAs single hetero-junction structure manufactured by Hitachi, Ltd.

As the photo-diode 105, a photo-diode having a relative light receiving sensitivity of about 80% at an orientation inclined from the normal direction by 30 degrees, as designated by symbol B of four types of light receiving sensitivities A1, B1, C1 and D1 shown in FIG. 15, is used assuming that the normal direction of the light receiving surface is zero degrees and the light receiving sensitivity of light incident from the normal direction is 100%. The photo-diode of the type having such directivity characteristics is exemplified by a photo-diode TO-18 manufactured by Hamamatsu Photonics co., Ltd.

Figure 13:
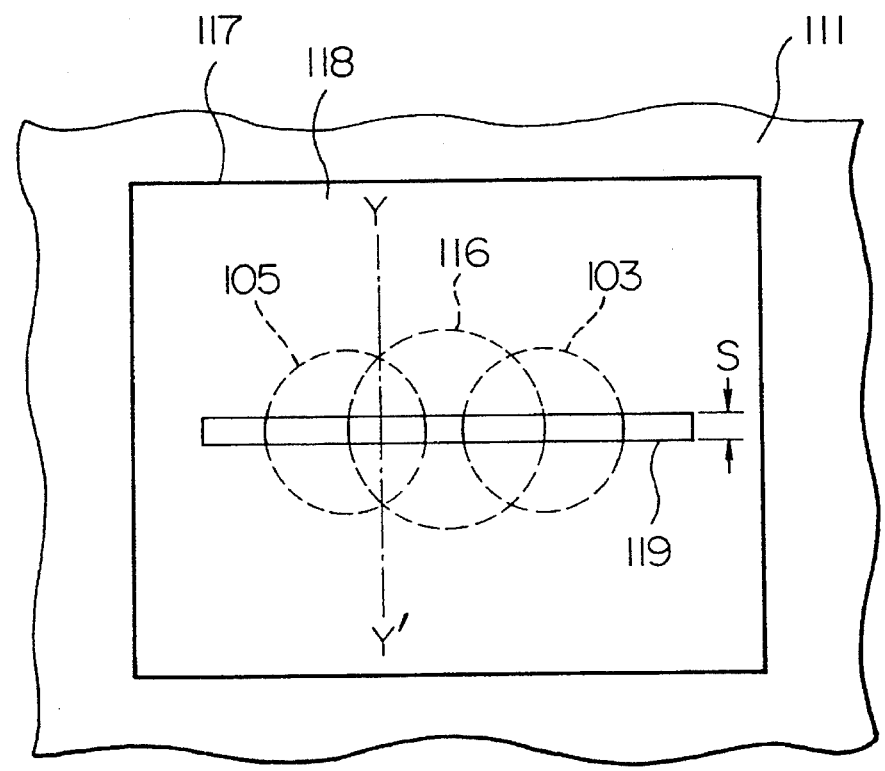
FIG. 13 is a sectional view taken along line XIII—XIII of FIG. 12.

The slit plate 118 having the slit 119, as shown in FIG. 13, is fastened to the slit plate setting portion 117. The slit width s is determined to be the same, preferably slightly narrower than the width of the thinnest bar code in a case where the latent image 102 is formed according to the bar code system, as shown in FIG. 16. Within a range where the resolving power of the bar code is not affected, the slit width s of the slit 119 may be wider than the width of the thinnest bar code. As a result, the resolving power of the reading apparatus can be restricted, and therefore data recorded in the bar code can be correctly read out. The slit 119 is, of course, opened in a direction perpendicular to an imaginary line Y–Y' passing through substantially the central portion of the latent image 102 (an extension direction of each bar code), as shown in FIG. 13.

It is preferable that the clearance C from the slit plate 118 to the surface, in which the latent image 102 is formed, is adjusted to be 3 mm or less to meet a desire of the thickness reduction. Because of a similar reason, it is preferable that the distance D from the light emission surface of the infrared ray emitting diode 103 to the surface, in which the latent image 102 is formed, be adjusted to be 5 mm or less.

The filter 106 made of material, which permits only light emitted from the latent image 102 to pass therethrough, is mounted to the filter setting portion 115. As a result, the reflected infrared rays (background light) reflected by the card 101 and the light emitted from the latent image 102 can be distinguished from each other. Therefore, data can be read out at a high S/N ratio.

Although a terminal for reproducing data from an output signal from the photo-diode 105 is fastened to the upper portion of the mold 111, it is a known fact and it is not included in the an essential part of the present invention. Therefore, its description is omitted here.

Since the latent image reading apparatus according to the embodiment comprises, as the infrared ray source and the light detection device, the infrared ray emitting diode 103 exhibiting the directivity and the photo-diode 105 having a relatively low directivity, the elements 103 and 105 can be set in parallel to the normal direction of the surface in which the latent image 102 is formed. Therefore, the work for assembling the elements 103 and 105 can be completed by only inserting the elements into the mounting holes 113 and 114 opened vertically. Further, the work for bending lead wires of the electric parts can be omitted from the process while omitting the light conductive member and the lens group from the structure. Therefore, the number of parts can be decreased, causing the assembling and mass-productivity of the latent image reading apparatus to significantly be improved. In addition, as the light conductive member 107, and the lens group 109 and 110 can be omitted from the structure, the distance from the light receiving surface of the photo-diode 105 to the latent image forming surface can be shortened, and therefore the apparatus can be made thinner.

Although the latent image reading apparatus has been described in the embodiment taking the case of the card reader, appropriate change of the card insertion portion 112 provides an apparatus for reading a latent image formed on an arbitrary article.

Although the description has been made while taking the case of the apparatus for reading the card having the bar code type latent image thereon, the embodiment can be applied to a reading apparatus for an other type of latent image. The structure according to the embodiment in which the slit plate 118 is disposed on the upper surface of the card insertion portion 112 may be replaced by a structure in which it is disposed on the lower surface of the filter 106.

As described above, since the present invention comprises, as the infrared ray source and the light detection device, the infrared ray emitting diode exhibiting a high directivity and the photo-diode having a relatively low directivity, these elements can be set in parallel to the normal direction of the surface in which the latent image is formed. Therefore, the assembling and the mass-productivity can be significantly improved. Further, the light conductive member and the lens group from can be omitted when compared with the conventional technology. Therefore, the distance from the light receiving surface of the photo-diode to the latent image forming surface can be shortened, and therefore the apparatus can be made thinner.

Figure 38:
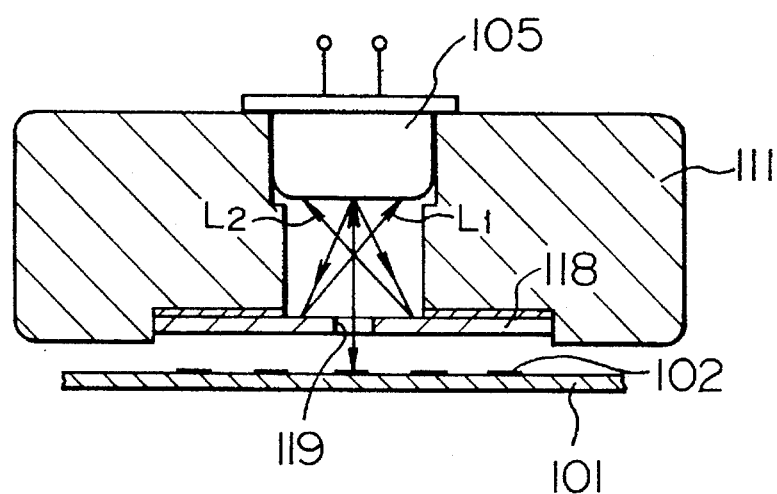
FIG. 38 is a sectional view for illustrating disadvantage of the optical reading apparatus shown in FIG. 12.

It has been found that the reading apparatus shown in FIG. 12, etc. is desired to be further improved. This will now be described with reference to FIG. 38. Since the slit sheet or slit plate 118 has been secured to the molded optical head body 111 by using the adhesive agent as shown in FIG. 38, it takes a long time to wait for drying the adhesive agent. Therefore, the working efficiency is unsatisfactory and there arises a risk that the slit sheet 118 is deviated at the time of the adhesion.

Further, the fact that the portions, in the vicinity of the slit 119, of the surface of the slit sheet 118 is exposed, light beams L1 and L2 reflected by the portions are also received by the photo-diode 105 which is the reflecting type photo-sensor. Therefore, a predetermined S/N value cannot be obtained, and accordingly, satisfactory reliability cannot be realized.

Figure 19:
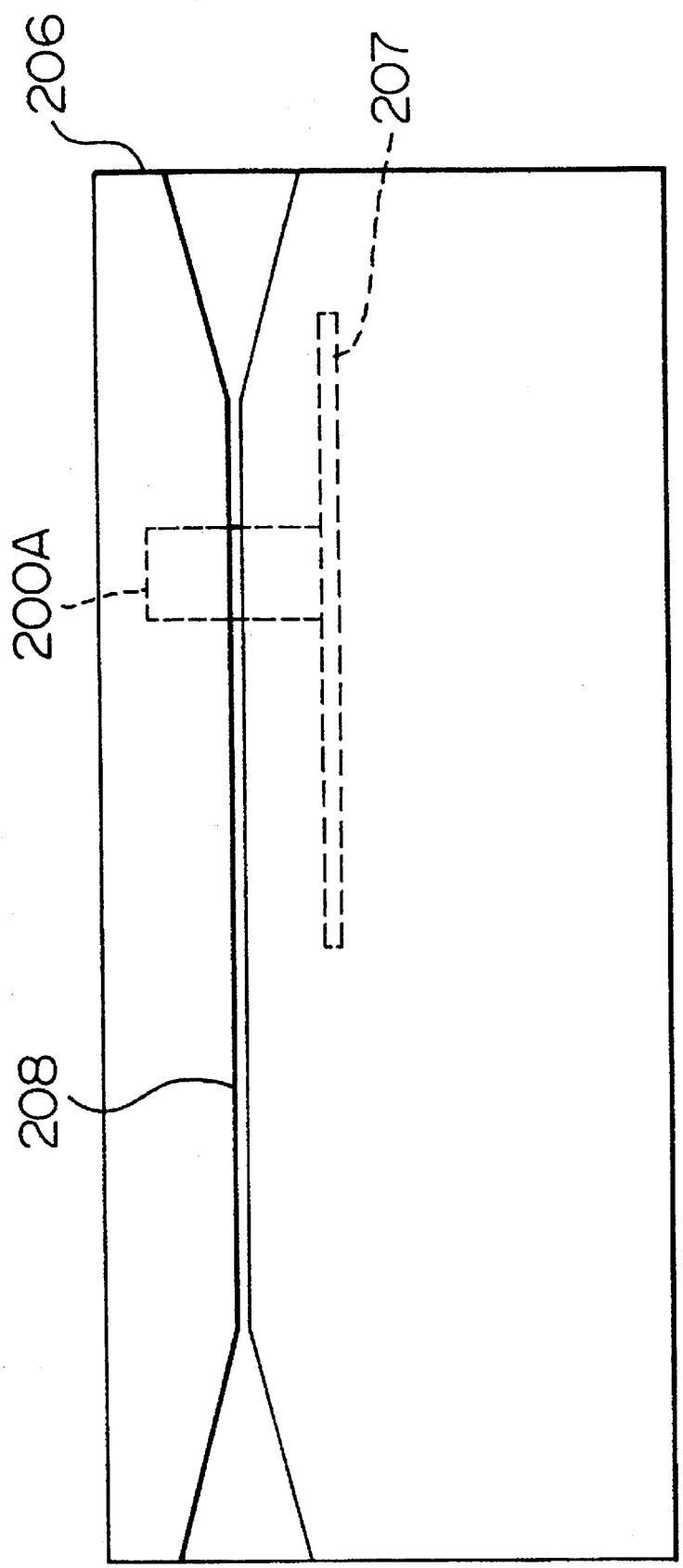
FIG. 19 is a schematic view of a bar code reader having an optical reading apparatus.

A reading apparatus capable of overcoming this problem will now be described. FIG. 19 is a schematic view of a bar code reader having an optical reading apparatus. Referring to FIG. 19, there is seen a bar code reader body 206, a printed circuit board 207 mounted on the inside of the bar code reader body 206, an insertion groove 208 for a member, such as a pre-paid card, to be detected. An optical reading apparatus 200A is disposed to face the insertion groove 208.

Figure 20:
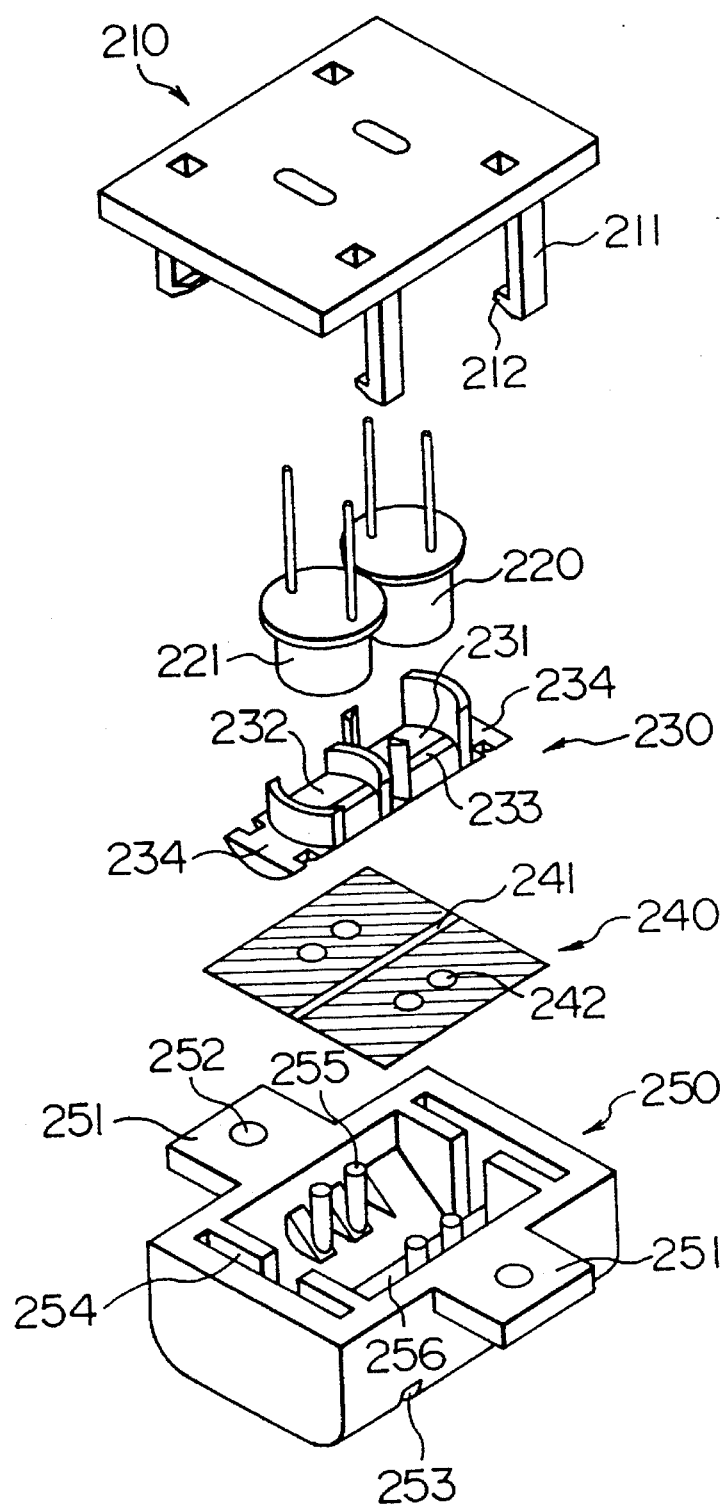
FIG. 20 is an exploded perspective view of an optical reading apparatus according to an embodiment of the present invention.

FIG. 20 is an exploded perspective view of the optical reading apparatus according to this embodiment. Referring to FIG. 20, there is seen a head cover 210 comprising four leg portions 211 projecting downwards, each of the four leg portions 211 having an engagement claw 212 at an inside of the distal end portion thereof. FIG. 20 further includes a light emitting device 220, a light receiving device 221, the two devices forming a reflecting-type photo-sensor. There is further seen an opaque sheet pressing member 230 colored in, for example, black, and comprising device holder portions 231 and 232, into which lower ends of the light emitting device 220 and the light receiving device 221 respectively are inserted to be held, slit-shaped light restricting holes 233 formed in lower surfaces of the device holder portions 231 and 232, and engagement pieces 234 at both ends thereof.

A slit sheet 240 is shown having a light transmissive (transmitting) portion 241 at the central portion thereof and positioning holes 242 formed in such a manner that two positioning holes are respectively formed in front of the light transmitting portion 241 and at a rear side of the same when viewed from the front position. An optical head body 250 is illustrated comprising mounting holes 252 respectively formed in the central portions of flanges 251 respectively projecting forwards and rearwards, recessed engagement portions 253 formed in four positions of a bottom portion thereof to receive to stop the engagement claws 212, engagement grooves 54 into which the engagement pieces 234 are inserted, positioning pins 255 inserted into the positioning holes 242, an opening portion 256 for reading formed in the bottom of the central portion thereof, and so forth.

Figure 21:
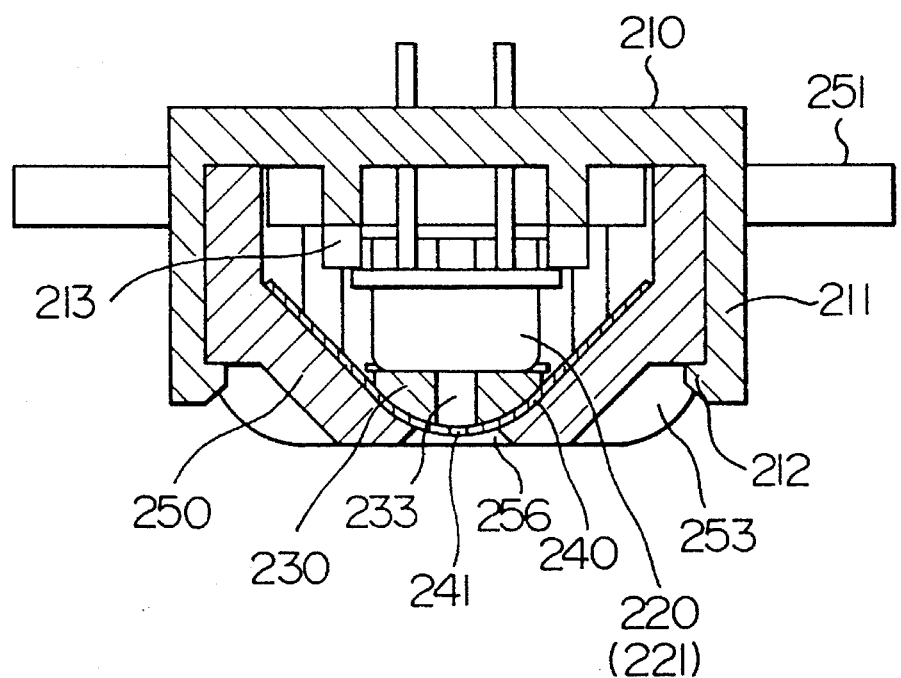
FIG. 21 is a front sectional view of an optical reading apparatus according to an embodiment of the present invention.

FIG. 21 is front sectional view of the optical reading apparatus according to this embodiment. As shown in FIG. 21, the slit sheet 240 is mechanically held between the sheet pressing member 230 having a substantially circular-arc-shaped bottom surface and a tapered surface of the optical head body 250 to be warped in such a manner that the central light transmitting portion 241 facing the light restricting hole 233 projects downwards to be pressed against the reading opening portion 256. Portions in the vicinity of the light transmitting portion 241 of the slit sheet 240 is covered with the bottom surface of the sheet pressing member 230. Further, the top surface of the sheet pressing member 230 covers an end surface of the light emitting device 220 except for the light emission surface and an end surface of the light receiving device 221 except for the light receiving portion.

The light emitting device 220 and the light receiving device 221 are pressed from upper sides by pressing pins 213 formed to extend downward from an inner surface of the head cover 210 so that upward loosening is prevented.

Figure 22:
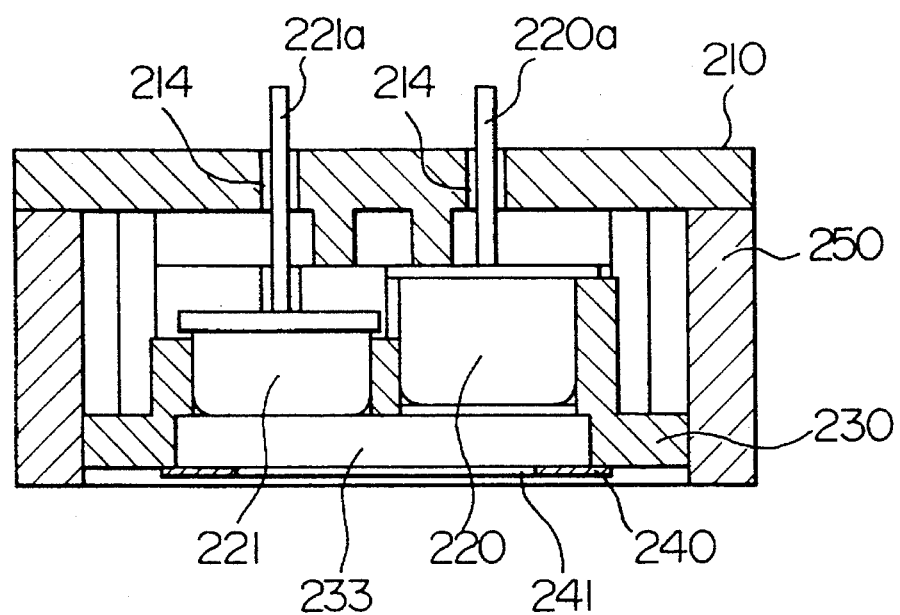
FIG. 22 is a side sectional view of an optical reading apparatus according to an embodiment of the present invention.

FIG. 22 is a side sectional view of the optical reading apparatus according to this embodiment. Terminals 220a of the light emitting device 220 and terminals 221a of the light receiving device 221 project out of opening portions 214 of the head cover 210.

Figure 23:
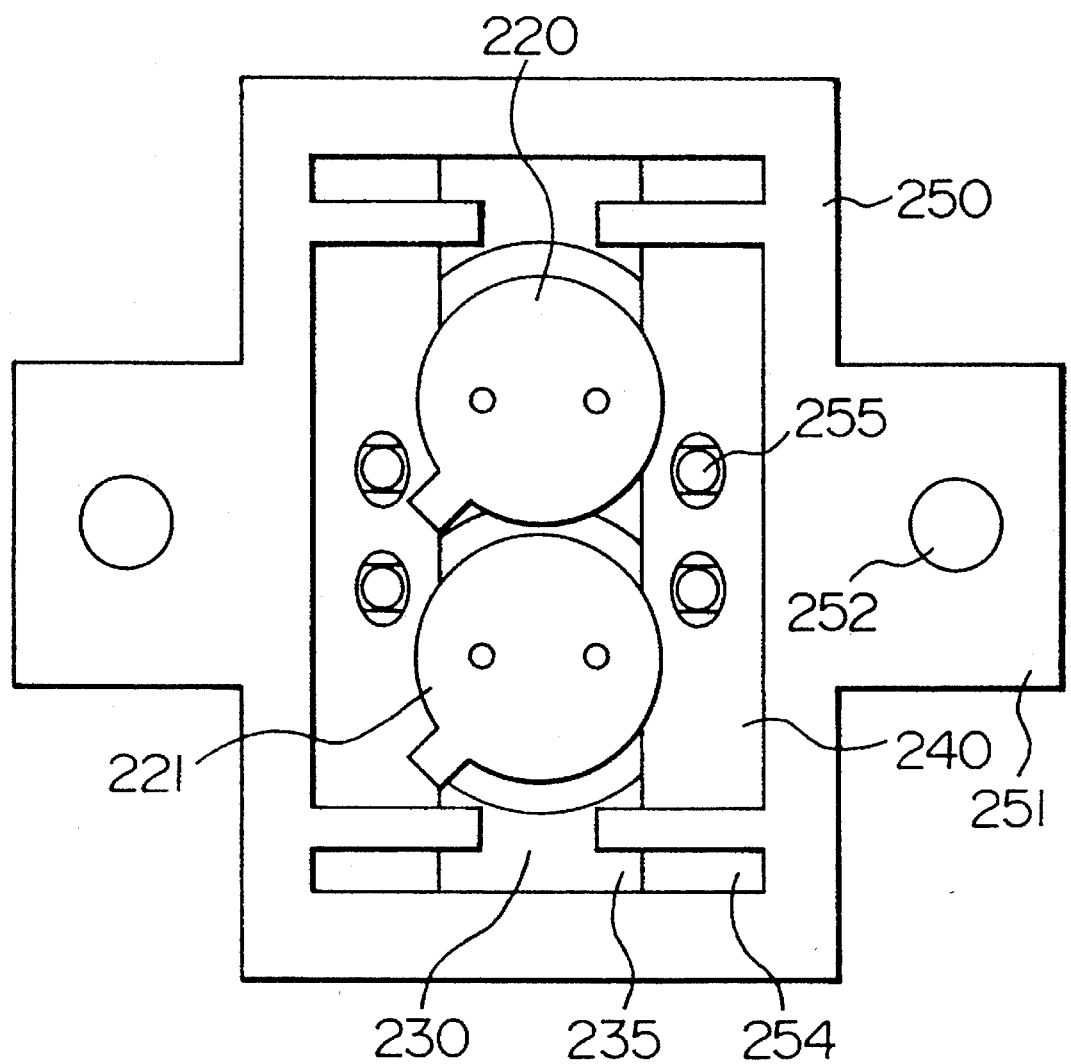
FIG. 23 is a plan view of an optical reading apparatus, according to an embodiment of the present invention, in a state where its head cover is removed.
Figure 24:
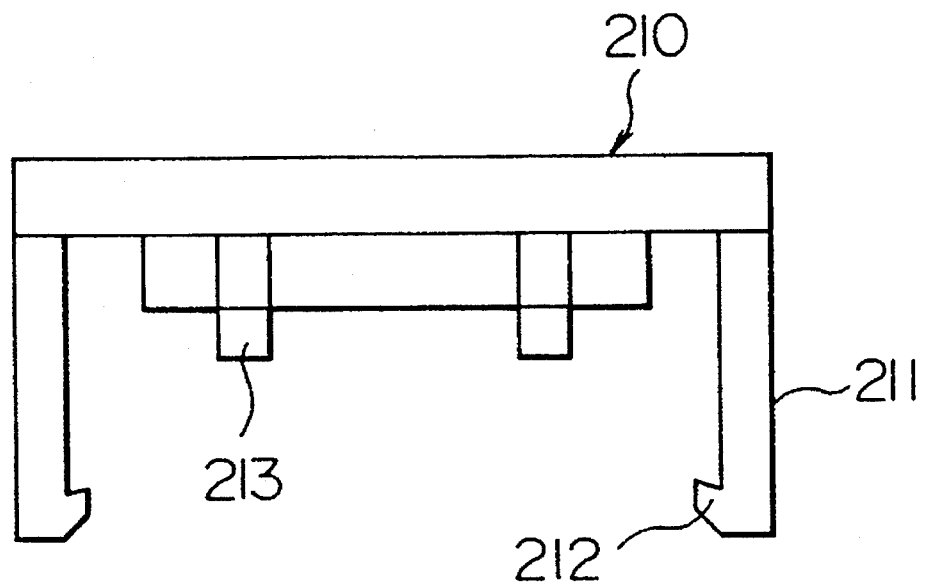
FIG. 24 is a front elevational view of the head cover.
Figure 25:
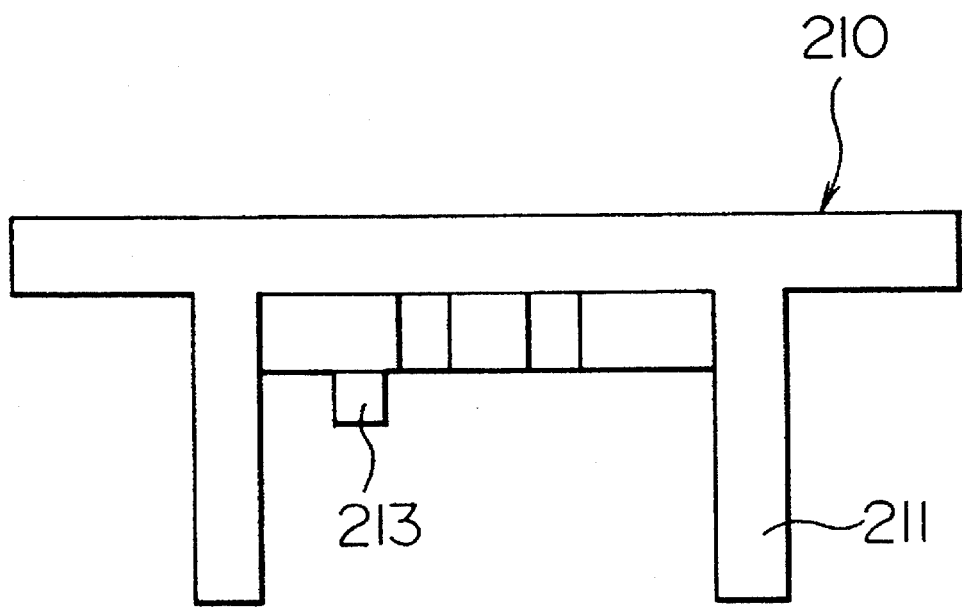
FIG. 25 is a side elevational view of the head cover.
Figure 26:
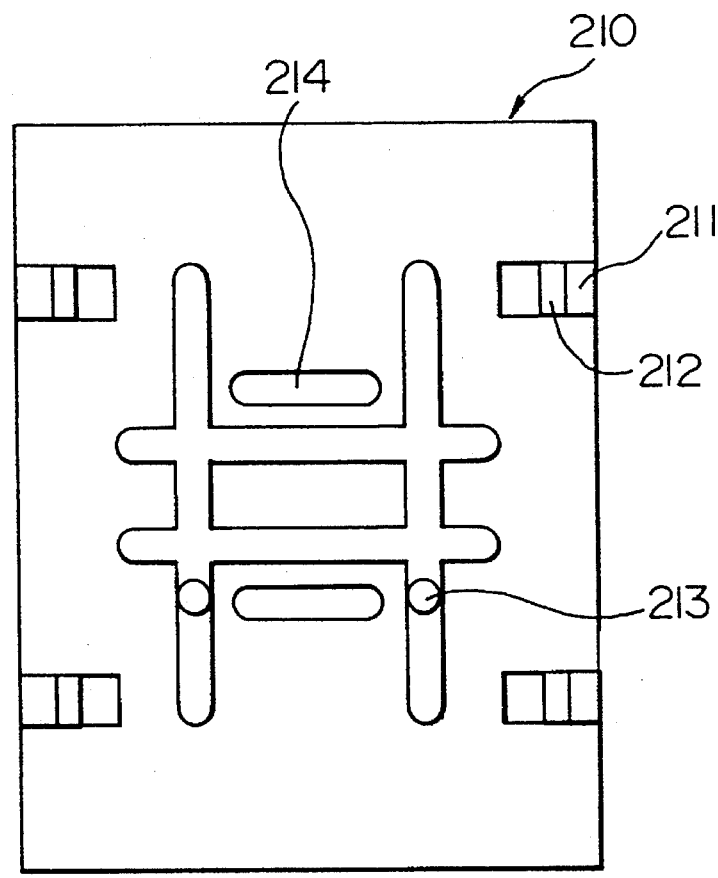
FIG. 26 is a bottom view of the head cover.

FIG. 23 is a plan view which illustrates a state of the optical reading apparatus from which the head cover 210 is removed. FIG. 24 is a front elevational view of the head cover 210. FIG. 25 is a side elevational view which illustrates the head cover 210. FIG. 26 is a bottom view of the head cover 210. In these drawings, the four leg portions 211, the four engagement claws 212, the two pressing pins 213 and the two opening portions 214, respectively, are illustrated.

Figure 27:
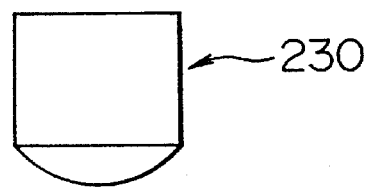
FIG. 27 is a front elevational view of a sheet pressing member.
Figure 28:
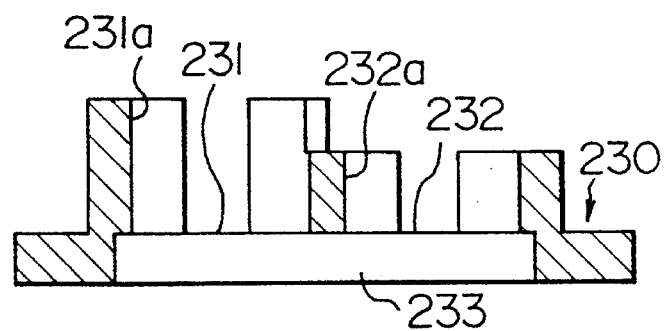
FIG. 28 is a side sectional view of the sheet pressing member.

FIG. 27 is a front elevational view which illustrates the sheet pressing member 230. FIG. 28 is a side sectional view of the sheet pressing member 230 illustrating a high cylindrical device-holding portion 231a, a low cylindrical device-holding portion 232a and the slit-like light restricting hole 233 formed below the device holding portions 231a and 232a.

Figure 29:
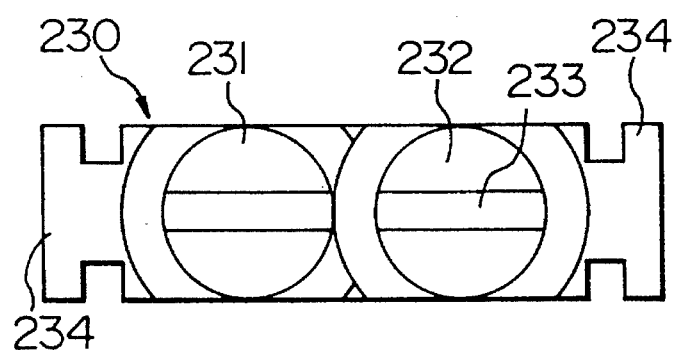
FIG. 29 is a plan view of the sheet pressing member.
Figure 30:
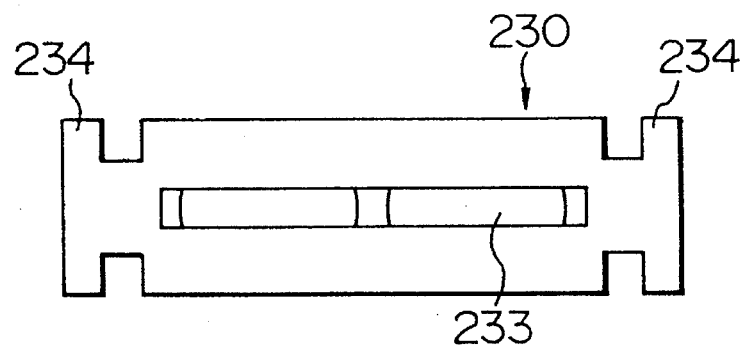
FIG. 30 is a bottom view of the sheet pressing member.

FIG. 29 is a plan view of the sheet pressing member 230, and FIG. 30 is a bottom view of the same.

Figure 31:
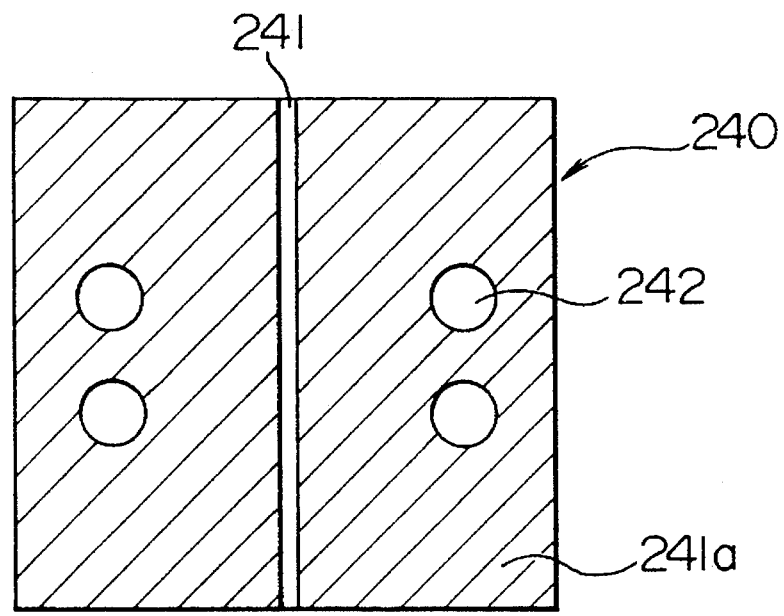
FIG. 31 is a plan view which illustrates an example of a slit sheet.

FIG. 31 is a plan view of an example of the slit sheet 240. In this example, a transparent plastic base film made of, for example, polyethylene terephthalate (PET) is covered except for the light transmissive portion 241, with an opaque layer 241a composed of a black printed layer.

Figure 32:
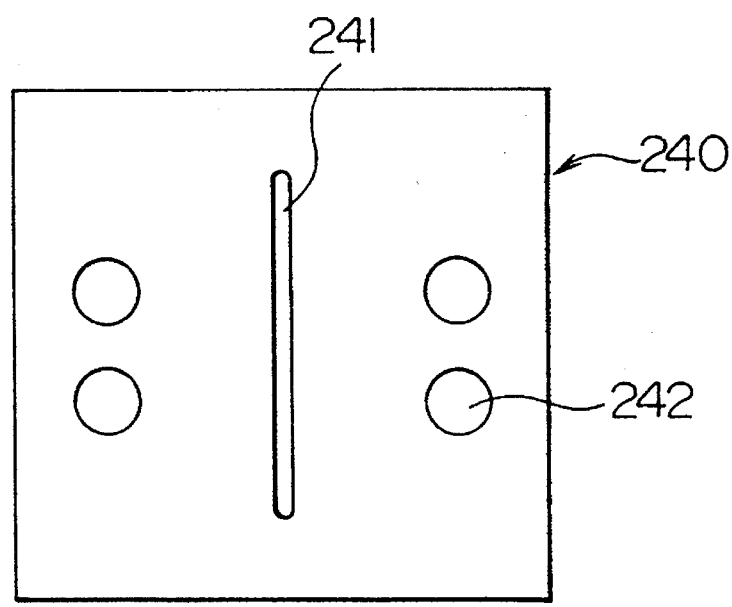
FIG. 32 is plan view which illustrates another example of the slit sheet.
Figure 33:
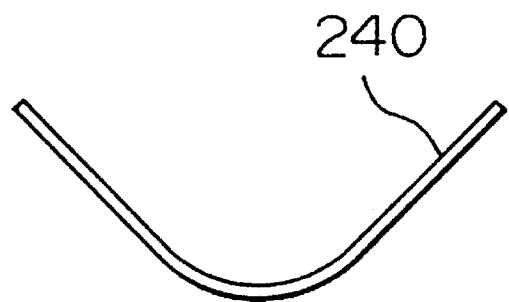
FIG. 33 is a front elevational view of the slit sheet in a state where the slit sheet made of a thin metal plate is warped as is done in actual use.

FIG. 32 is a plan view of another example of the slit sheet 240. In this example, a thin metal plate made of, for example, stainless steel is used while forming, by punching, the light transmissive portion 241 and the positioning holes 242. In the case where the slit sheet 240 made of the thin metal plate is used, it is used in a previously warped state, as shown in FIG. 33.

Figure 34:
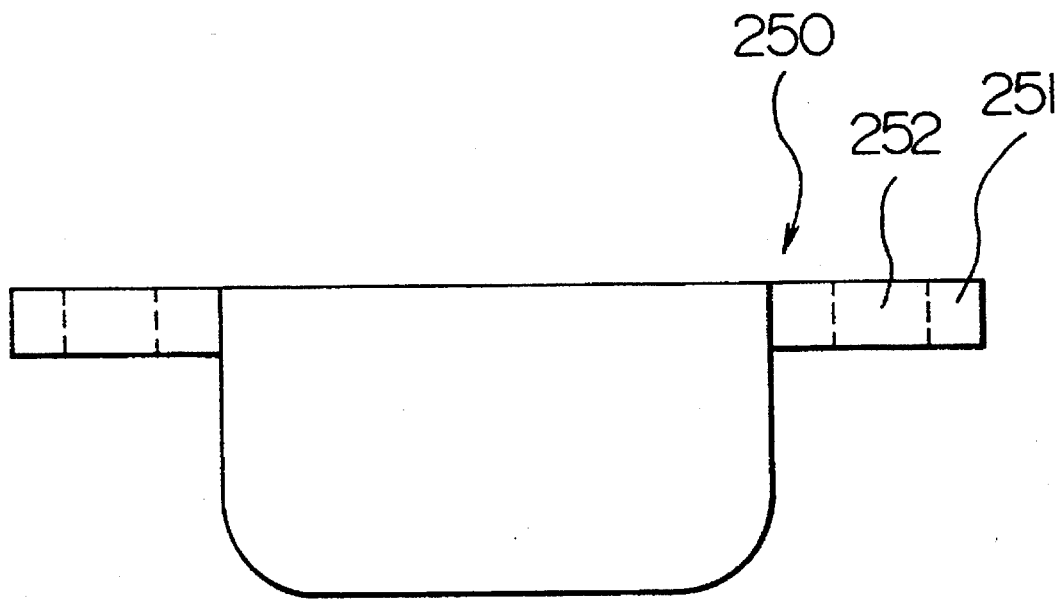
FIG. 34 is a front elevational view of an optical head body.

FIG. 34 is a front elevational view of the optical head body 250, in which the mounting holes 252 formed in the flange portions 251 are designated by dashed lines.

Figure 35:
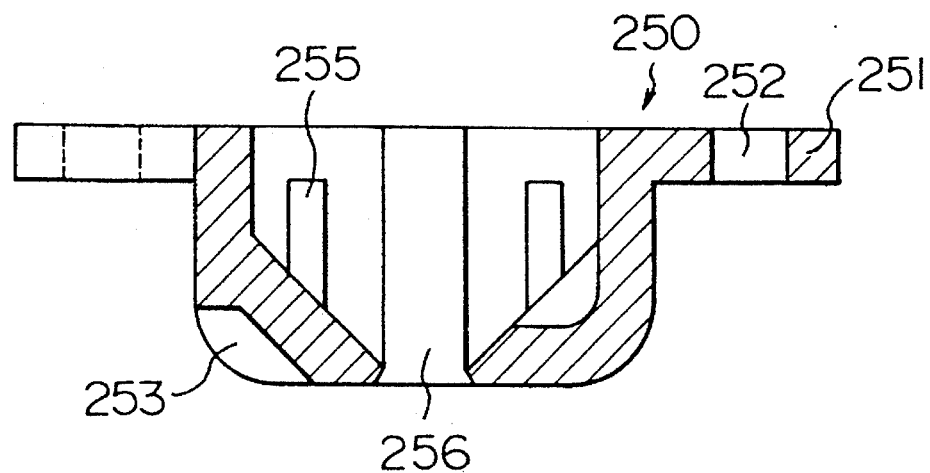
FIG. 35 is a front sectional view of the optical head body.

FIG. 35 is a front sectional view of the optical head body 250, in which the flange portions 251, the mounting holes 252, the recessed mounting portions 253, the positioning pins 255 and the reading opening portion 256 and the like are illustrated.

Figure 36:
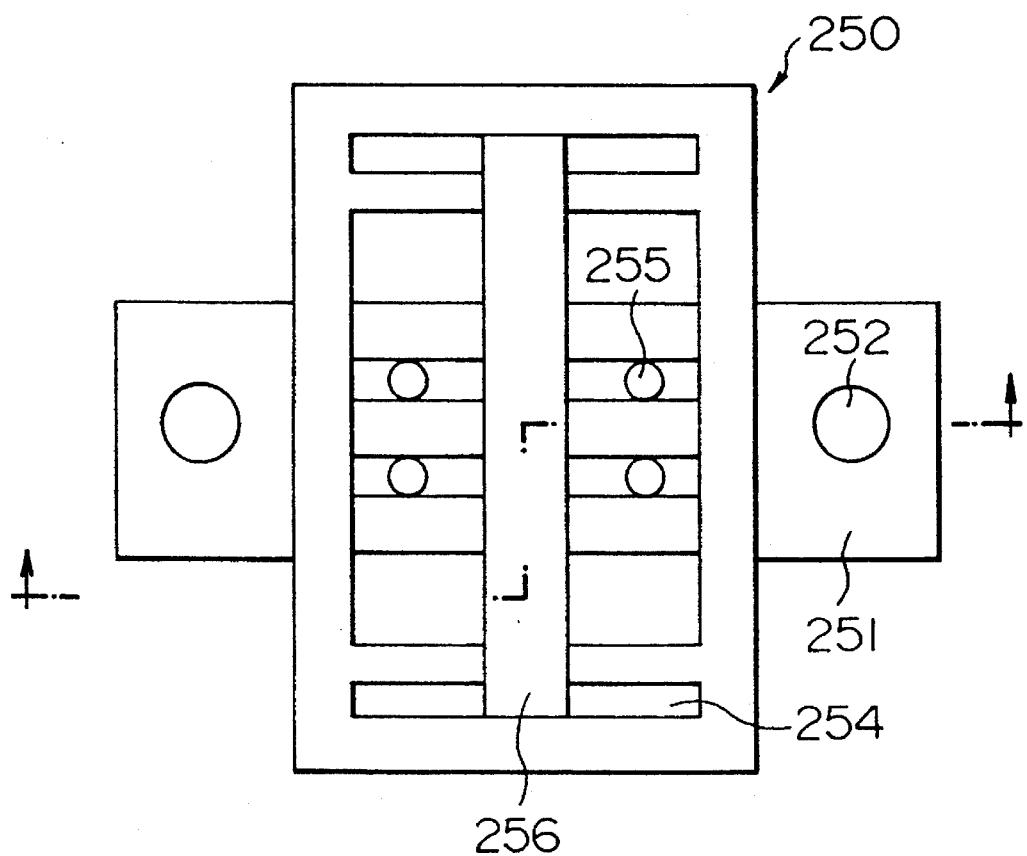
FIG. 36 is a plan view of the optical head body.

FIG. 36 is a plan view of the optical head body 50, in which the flange portions 251, the mounting holes 252, the engagement grooves 54, the positioning pins 255 and the reading opening portion 256 and the like are illustrated.

Figure 37:
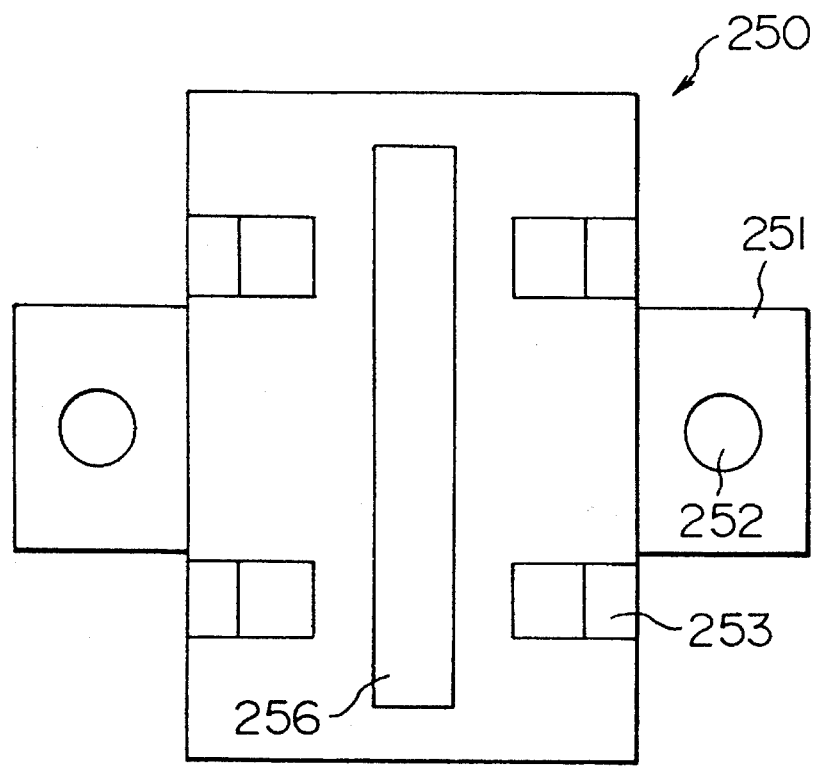
FIG. 37 is a bottom view of the optical head body.

FIG. 37 is a bottom view of the optical head body 250, in which the flange portions 251, the mounting holes 252, the recessed engagement portions 253 and the reading opening portion 256 and the like are illustrated.

When the fluorescent mark (the latent image mark) is read by the optical reading apparatus according to the present invention, the following applications can be contemplated and following characteristics are attained.

(1) In the factory automation (FA) filed, partial management at the time of assembling automobiles that is, model types, export destinations, manufactured dates, and lots and so forth, can be managed by using the fluorescent marks (the latent image marks), which are not easily visible, without affecting the appearance.

(2) If a mark is formed in a black substance, for example, a black tire, or a transparent material such as glass, which cannot be read out in case of the conventional reflecting-type bar code, the mark can be read.

(3) If characters or a designed form is printed on the fluorescent mark (the latent image mark), the fluorescent mark (the latent image mark) can be read out. Therefore, a small space, such as a price label or a tag of a commodity can be effectively used.

(4) Because of the same reasons as those of (1) and (3), the present invention is effective when it is used in commodities such as cosmetics or drugs, to which a designs are attached greater importance, or various decorative boxes or packages that should give high quality feeling.

(5) Even in an environment in which the conventional reflecting type bar code cannot be used due to contamination by oil or dust in a plant or a work shop or the like, the fluorescent mark (the latent image mark) can be read out.

(6) Because of the same reasons as those of (1) and (3), the management information needed by the manufacturer can be put, as a hidden code for the physical distribution management and the slip management, on the statements of delivery (usually the statement of delivery has a format specified by a customer and has only information that is needed by the customer).

(7) Information can be, as a hidden code, put on a card-like structure to ne used as a game card (a bar code game). In particular, forming of a hiding layer or a laminated layer enables the hidden code to be completely invisible.

(8) Because of the same reasons as those of (1) and (3), use of the fluorescent mark to manage books or libraries will not affect the design quality.

(9) Since the fluorescent mark cannot easily be forged, altered or changed, it can be used to manage person's entrance and withdraw, the attendance management (the time recorder) or used as a key card in a hotel.

(10) Forgery, alternation or change of securities or stock certificates can be prevented.

(11) Forgery, alternation or change of credit cards, cash cards or telephone cards can be prevented.

(12) Forgery, alternation or change of student identification cards or ID cards can be prevented while reducing the size and the occupying space.

(13) Forgery, alternation or change of stamp cards or point cards can be prevented. Further, the needed size and the space can be reduced.

(14) Forgery, alternation or change of betting tickets on, for example, horses or bicycles, can be prevented.

(15) It can be used in a pinball machine premium exchange system to prevent forgery, alternation or change.

The present invention is arranged in such a manner that a portion, around the through hole portion of the slit sheet is covered with one end surface of the sheet pressing member. Therefore, reflection light from the foregoing portion can be eliminated, resulting in that the S/N can be improved. As a result, reading reliability can be improved.

The present invention is arranged in such a manner that the other end surface of the sheet pressing member covers the end surfaces of the light emitting device and the light receiving device except for the light emitting portion and the light receiving portion. Therefore, reading reliability can further be improved.

The present invention is arranged in such a manner that the sheet pressing member also serves as the device holder for holding the light emitting device and the light receiving device. Therefore, the size of the overall body of the apparatus can be reduced and the structure of the same can be simplified.

The present invention is arranged in such a manner that the slit sheet is formed by the opaque layer except for the portion of the through hole. Therefore, the effect of preventing the light reflection in the foregoing portion can further be improved. The present invention enables the fluorescent mark to be accurately be read.

An embodiment of a reading system to achieve the third object of the present invention will now be described.

Figure 54:
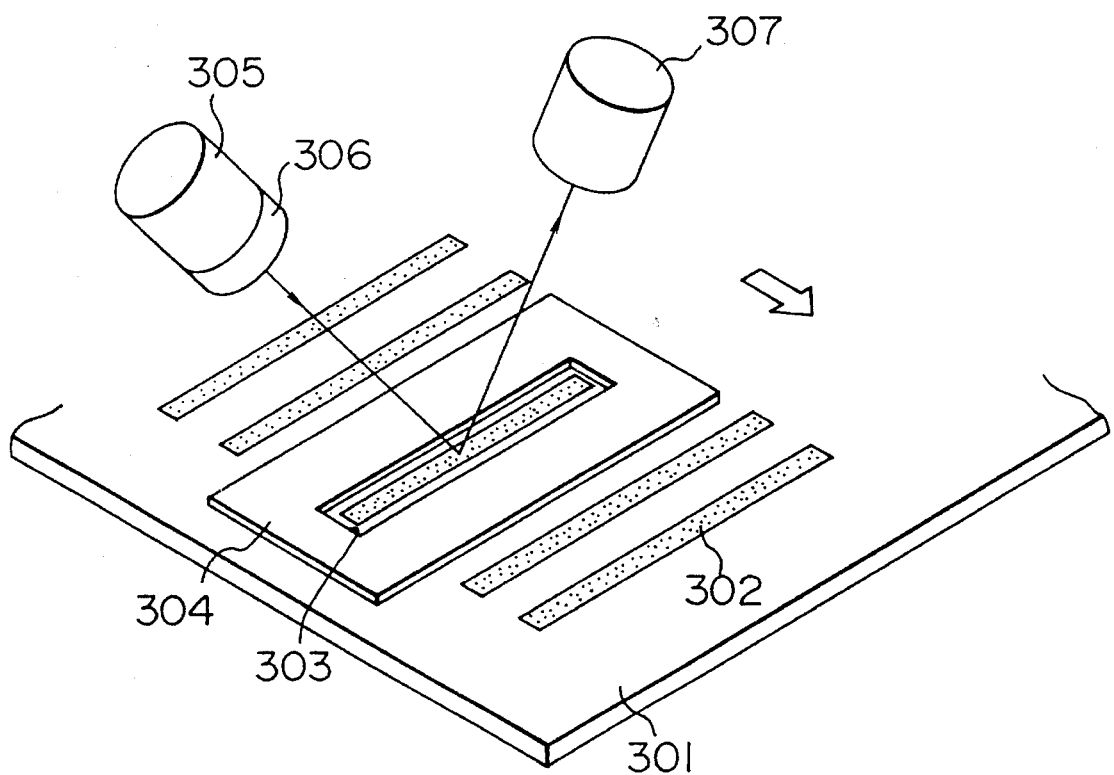
FIG. 54 is a schematic configurational view of the latent image mark reading apparatus, which has been studied before.

Prior to making the description of the embodiment of the present invention, a reading apparatus investigated beforehand by the inventor of the present invention will now be described with reference to FIG. 54. In a predetermined area of a sheet 301, a multiplicity of bar-shaped latent image marks 302 each having a predetermined width are printed in a direction perpendicular to the sheet reading direction. The latent image marks 302 are composed of fluorescent grains, which emit excited light when they are irradiated with infrared rays, and a transparent binder for dispersing and holding the fluorescent grains. A slit plate 304 having a slit 303 along the longitudinal direction of the latent image mark 302 is disposed above the sheet 301. Further, a light source 305, to which a filter 306 is attached, and a light receiving device 307 are disposed above the slit plate 304 to be aligned in parallel with the longitudinal direction of the slit 303. By disposing the light source 305 and the light receiving device 307 as described above, a characteristic can be attained in that shielding of light by the slit 303 can be prevented, and therefore the output from the light receiving device 307 can be increased.

Figure 55:
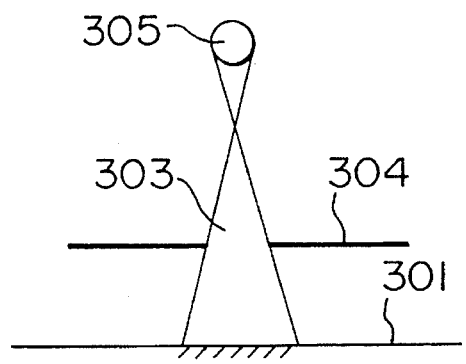
FIG. 55 is a view which illustrates expansion of irradiation light emitted from the light source.

However, this structure encounters the following problem. That is, a range wider than the slit width is irradiated with light, as shown in FIG. 55. Therefore, the change in the pulse width is likely to be enlarged at the time of reading the latent image marks 302. As a result, a complicated conversion circuit should be used to correct the change, causing a problem an increase in the cost.

An embodiment of the present invention will now be described. In this embodiment, a card-shaped information medium is used and an apparatus for reading the information medium comprises a card reader/writer. A structure of a card reader/writer 310 will now be described with reference to FIG. 43. The card reader/writer 310 is mainly composed of a card reader/writer body 311, a portable personal computer 312 for transmitting data necessary for the card reader/writer body 311, and a printer 314 for indicating a state of writing on the card 313. The personal computer 312 previously stores the number of issued cards 313, the codes of the issuance shops, the types of the money and the time of the issuance by using a keyboard. The personal computer 312 and the card reader/writer body 311 are connected to each other by an RS-232C standard serial line 315. When the stored data is supplied to the card reader/writer body 311, the card reader/writer body 311 automatically performs a process of writing main information into the card 313 in accordance with the supplied information.

The card reader/writer body 311 has a single-chip microprocessor for control, operates solely in accordance with supplied information and comprises a card supply portion 316 for taking out the cards 313 one by one from a multiplicity of the cards 313 stacked as illustrated, a mark detection portion 317 which reads sub-information of the card 313 having been taken out from the card supply portion 316 to discriminate the validity, an invalid card discharge portion 318 for discharging the card 313 having been discriminated as invalid in the mark detection portion 317, a card data processing portion 319 for reading/writing main information of the card 313, a card accommodating portion 320 for discharging the card 313 on which the main information has been written, and a control portion 321 for transmitting control signals to the foregoing portions.

In the card supply portion 316, the cards 313 are accommodated within a guide frame 322 in a state where the they are stacked horizontally with their surfaces, in which the latent images 302 are formed, to face downwards. A counter weight 323 for applying predetermined pressing force in the vertical direction is disposed on the stacked cards 313. Further, card discharge rollers 325 and 326 are so disposed to slightly project out of a bottom wall 324 of the guide frame 322. In addition, a plate 328 is finely adjustably fastened to a side of a front wall 327 of the guide wall 322 above the same plane as the bottom wall 324 in order to form a gap, through which only one card 313 can be passed. The front card discharge roller 325 is connected to a motor 329. When the motor 329 is rotated in response to a drive signal supplied from the control portion 321 (see FIG. 43), the lowermost card 313 which is in contact with the card discharge rollers 325 and 326 is moved forwards. In a state where the surface of the card 313, in which the latent image mark 302 is formed, faces downwards, the cards 313 are sent toward the mark detection film 317 one by one.

The mark detection portion 317, as shown in FIGS. 44 to 47, comprises a travel portion 330 for horizontally moving the card 313, a detection head 331 integrally accommodating therein a light source 305 disposed below a card movement surface and arranged to intermittently irradiate the latent image mark 302 of the card 313 with infrared rays and a light receiving device 307 for detecting excited light emitted from the latent image mark 302 during a period in which the light source 305 is lit off, and a detection circuit 332 for processing a signal delivered from the light receiving device 307.

The travel portion 330 comprises guide rails 333 for supporting horizontally two side ends of the card 313, the guide rails 333 being secured to extend parallel to each other on the two sides of the movement passage. Driver rollers 335 and 336 to be rotated by the motor 334 and pressing rollers 337 and 338 for pressing the card 313 from positions above the drive rollers 335 and 336 form pairs in such a manner that the pairs are respective disposed in the inlet and outlet portions of the mark detection portion 317.

A photo-interrupter 339 is disposed at the inlet portion of the mark detection portion 317. When supply of the card 313 from the card supply portion 316 is detected, the motor 334 is rotated forwards to move the card 313 at a constant speed of about 200 to 400 mm per second. As a result, the latent image marks 302 formed in the lower surface of the card 313 are sequentially passed over the light source 305 and the light receiving device 307.

Figure 45:
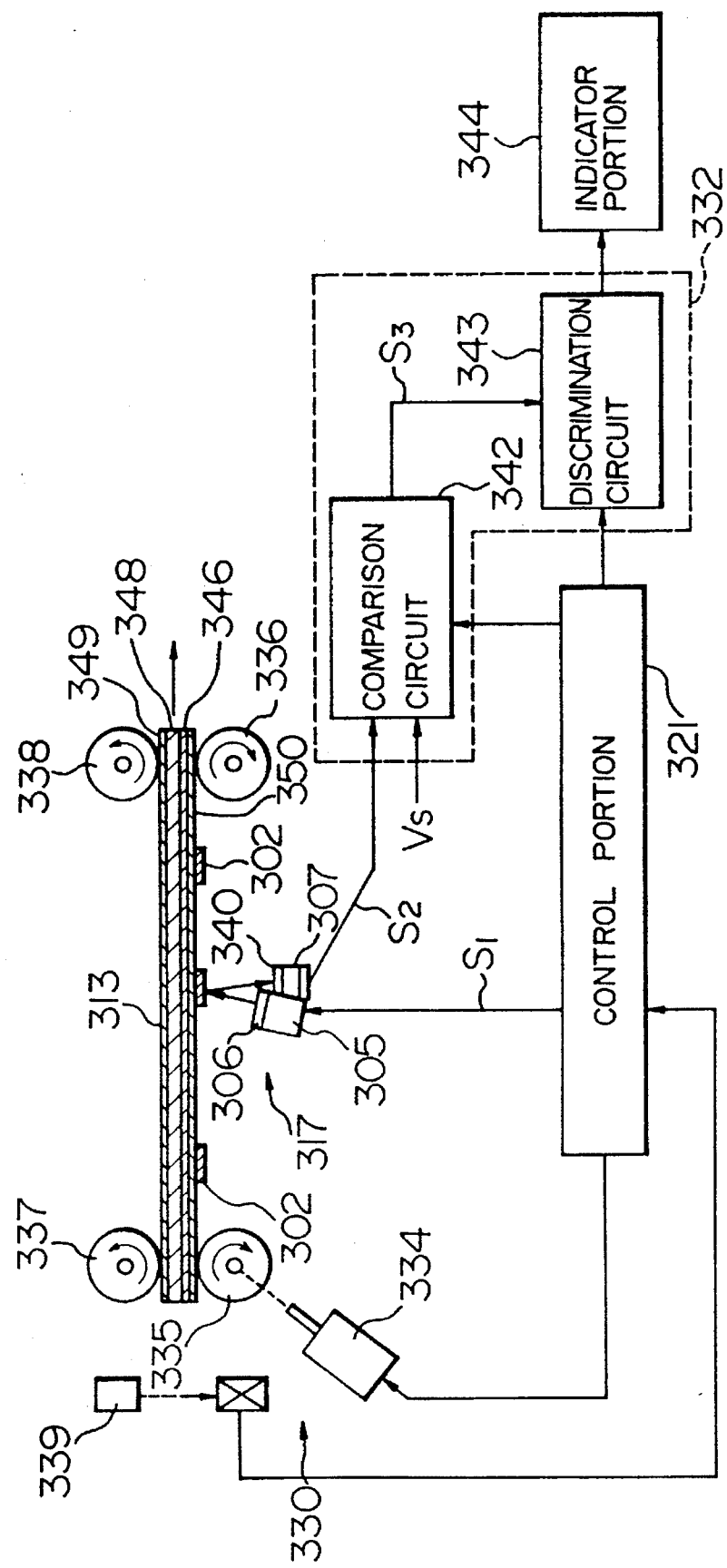
FIG. 45 is a schematic structural view of a mark detection portion of the card reader/writer.
Figure 46:
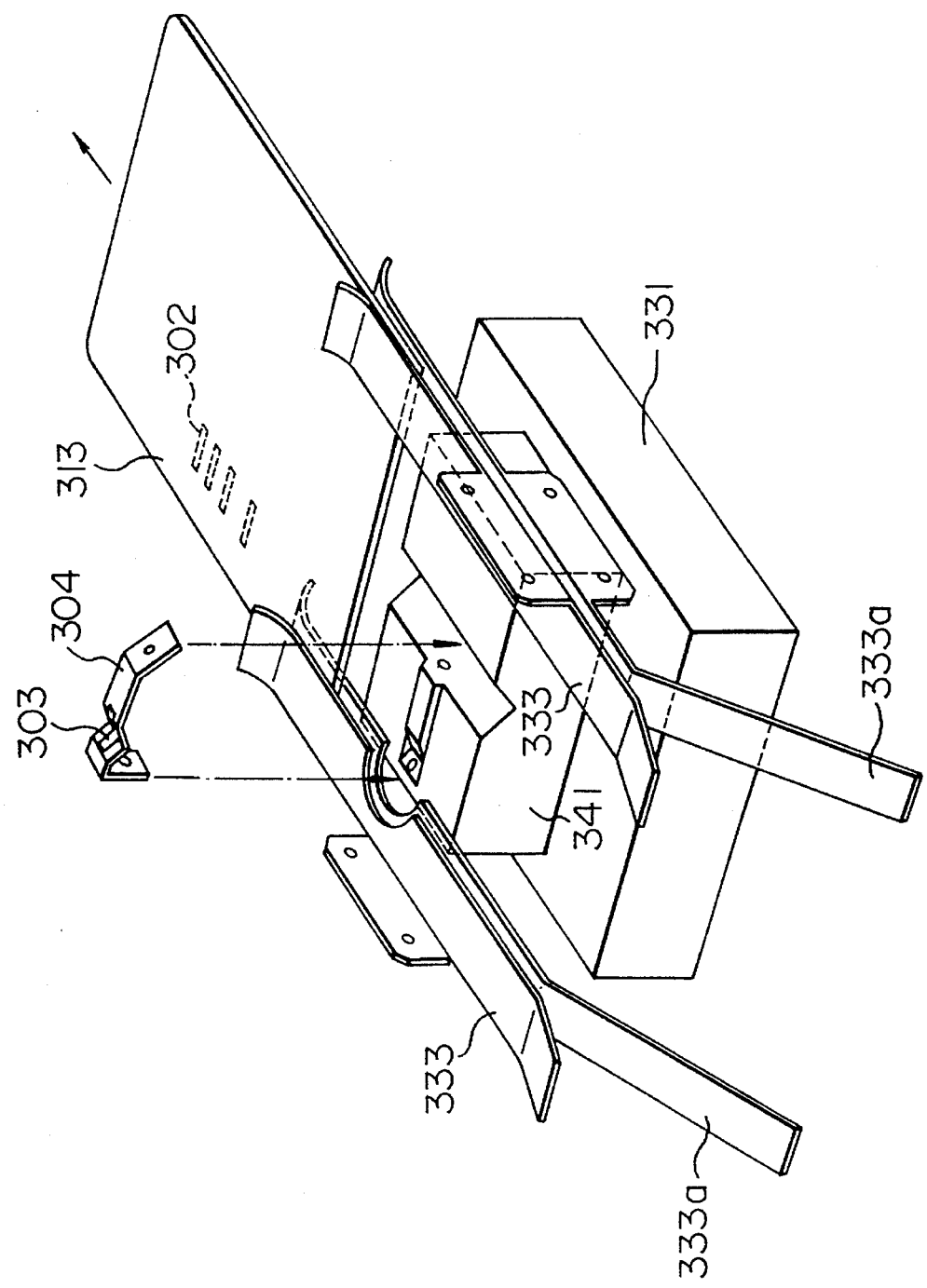
FIG. 46 is an exploded perspective view of the mark detection portion of the card reader/writer.
Figure 47:
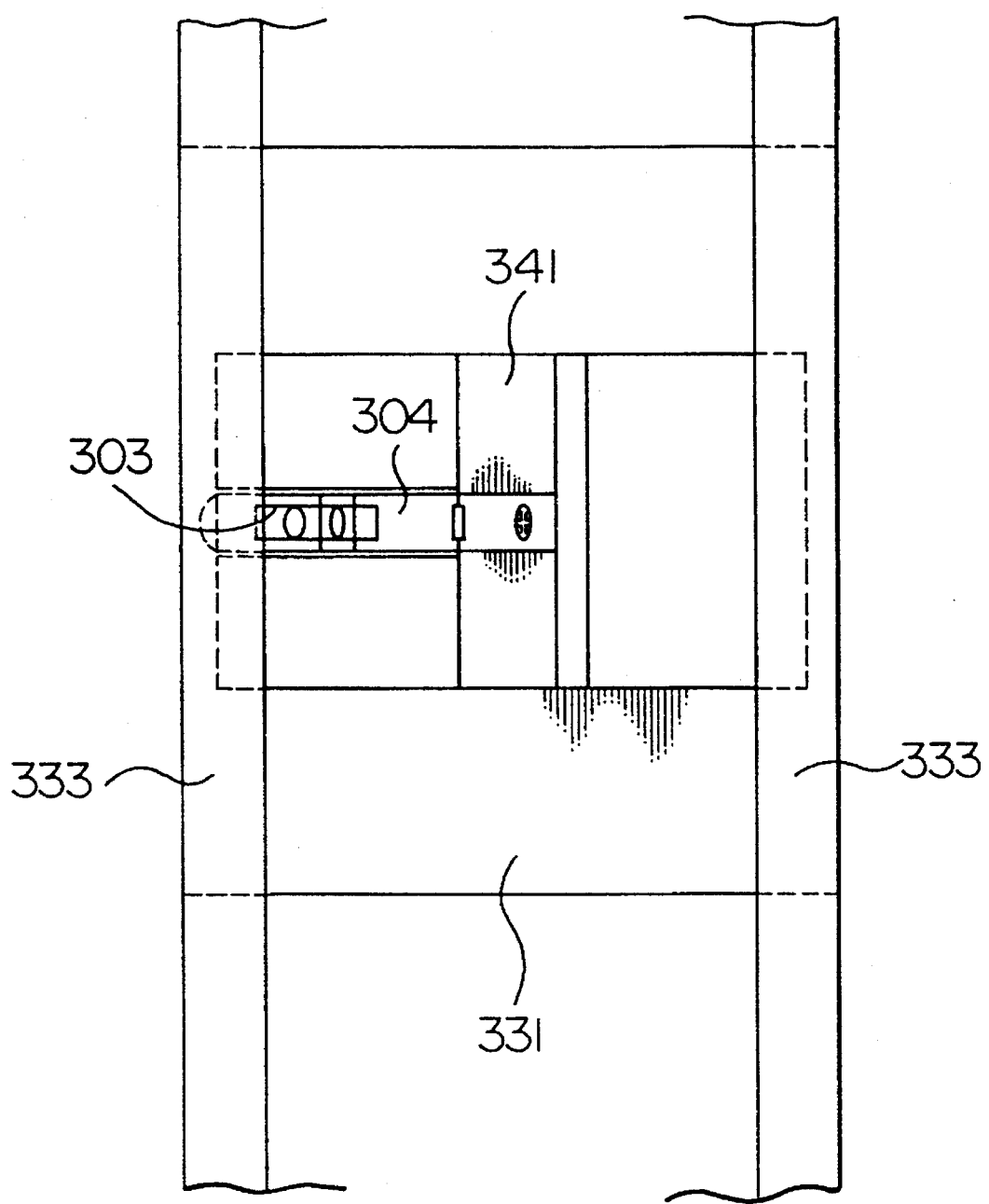
FIG. 47 is a plan view which illustrates the mark detection portion of the card reader/writer.
Figure 48:
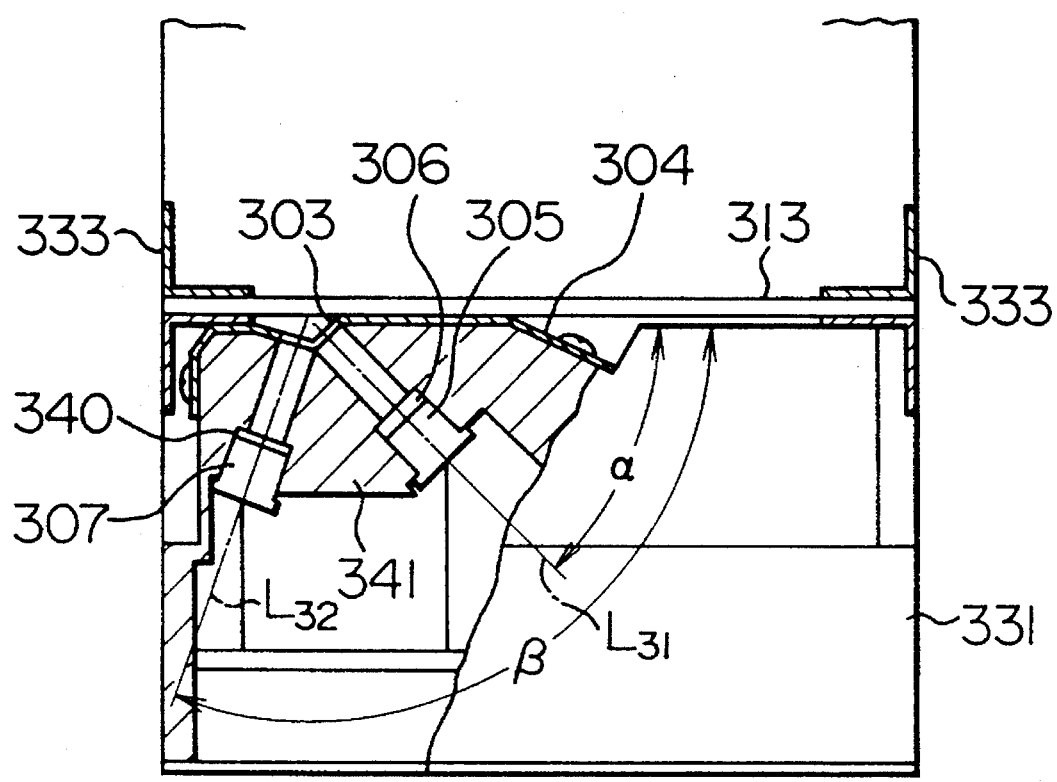
FIG. 48 is a sectional view of the mark detection portion of the card reader/writer.
Figures 49A, 49B, 49C:
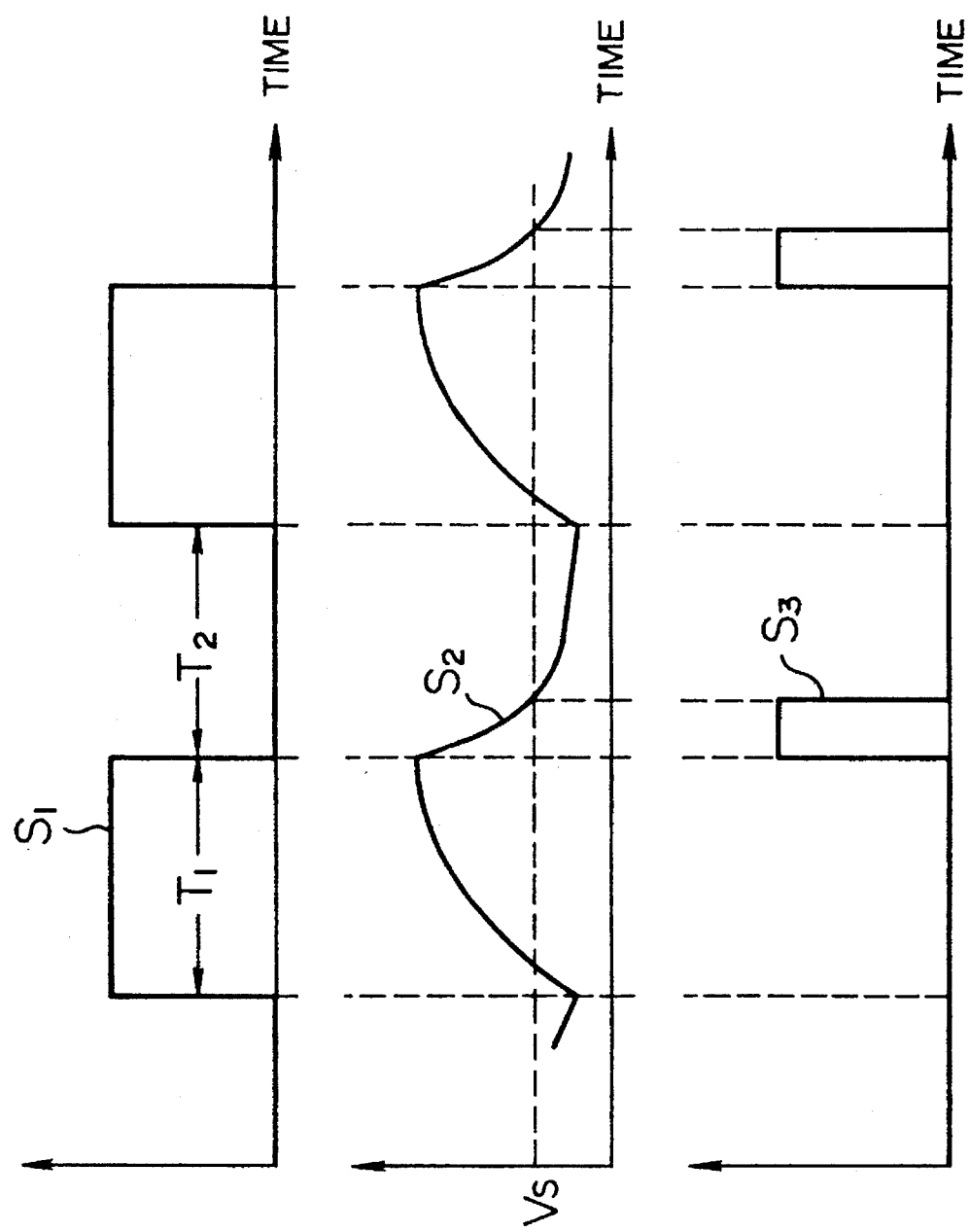
FIG. 49A is a graph which illustrates a waveform of infrared ray emitted from a light source for detecting the latent image mark in an embodiment of the present invention.
FIG. 49B is a graph which illustrates a waveform of an electric signal supplied from the light receiving device to a detection circuit.
FIG. 49C is a graph which illustrates a waveform of an output signal from a comparison circuit.
Figure 50:
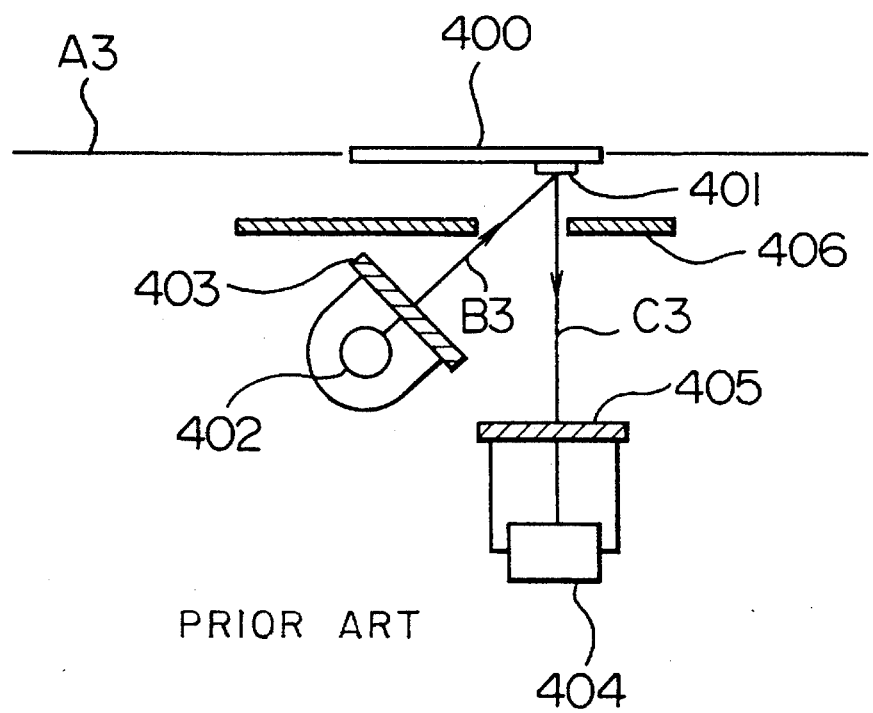
FIG. 50 is a schematic structural view of a conventional apparatus for reading a latent image.
Figure 51:
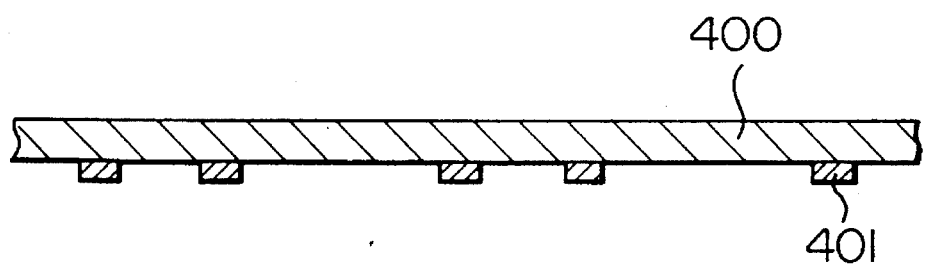
FIG. 51 is a view which illustrates a state where the latent image mark is formed.
Figure 52A:
FIG. 52A is a graph which illustrates the waveform of an output from a light receiving device of a conventional reading apparatus in a case where the latent mark is a light-emitting type mark.
Figure 52B:
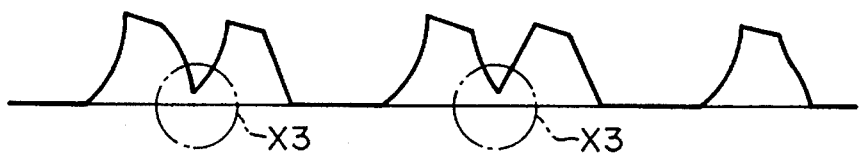
FIG. 52B is a graph which illustrates the waveform of an output from the light receiving device in a case where the slit is brought close to the latent image mark in the conventional reading apparatus.
Figure 52C:
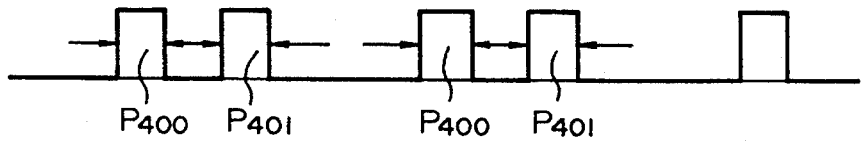
FIG. 52C is a graph which illustrates the waveform of an output in a case where the signal shown in FIG. 52B is changed into pulses.
Figure 52D:
FIG. 52D is a graph which illustrates the waveform of an output from the light receiving device in a case where the latent image mark is a reflecting type mark and the slit width is narrow.
Figure 53:
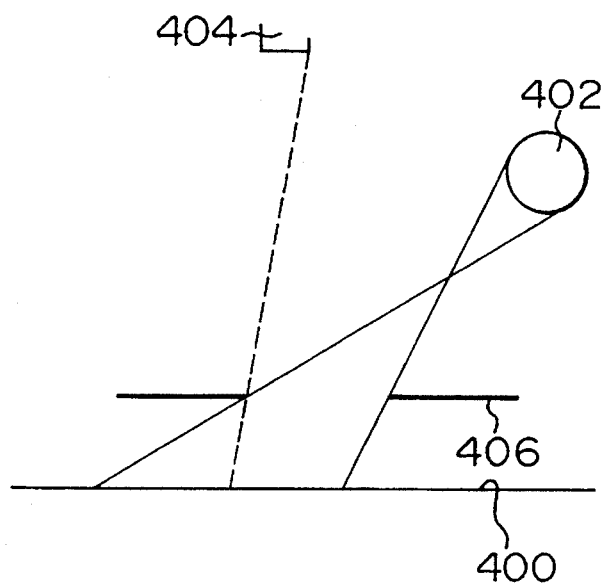
FIG. 53 is a view which illustrates paths of irradiation light emitted from the light source and of light emitted from the latent image mark.

The light source 305 comprises a light emitting diode which emits near infrared rays, the center wavelength of which is about 970 nm, the light source 305 having, as shown in FIGS. 45 and 48, the filter 306 mounted to a light emission portion thereof. In response to a signal S1 supplied from the control portion 321, the light source 305 is turned on/off, as shown in FIG. 49A, at almost the same time intervals of light-on time T1 and light-off time T2, each of which is 500 μsec, so that the latent image mark 302 is intermittently irradiated.

The light receiving device 307 comprises a photo-diode having a received light sensitivity in the infrared region, the light receiving device 307 having a filter 340 for selectively passing light emitted from the latent image marks 302 on each light receiving surface thereof. The light source 305 and the light receiving device 307 are disposed in a direction substantially perpendicular to the direction in which the card 313 is read. Therefore, the light source 305 and the light receiving device 307 are situated vertically when viewed in a direction facing the surface of the sheet.

As shown in FIG. 48, the light source 305 is disposed in a state with an inclination angle α of 45° to 60° from the lower surface (the horizontal surface) of the card 313, and the light receiving device 307 is disposed in a state with an inclination angle β of 105 to 115° from the lower surface (the horizontal surface) of the card 313, the light source 305 and the light receiving device 307 respectively being disposed along optical axes L31 and L32.

AS shown in FIG. 48, the slit plate 304 having the slit 303 extending in the direction perpendicular to the direction in which the card 313 is read, that is, in the longitudinal direction of the latent image mark 302 is disposed between the light source 305 and light receiving device 307 and the card 313. The slit plate 304, the light source 305 and the light receiving device 307 are mounted to a base 341.

The intensity of electric signal S2 supplied from the light receiving device 307 to a detection circuit 332 is increased, as shown in FIG. 49B, when the irradiation from the light source 305 is started because reflected light, from the light source 305, that could not be cut by the filter 340 is superposed on the excited light from the latent image mark 302. When the irradiation from the light source 305 is stopped, only light from the latent image mark 302 is detected and therefore the intensity decreases expotentially. Therefore, the electric signal S2 is supplied to a comparison circuit 342, which is operated to correspond to a period of time during which the light source 305 is lit off, to be subjected to a comparison with a predetermined value Vs. As a result, as shown in FIG. 49C, a rectangular waveform S3 corresponding to a position, at which the latent image mark 302 is formed, at a time immediately after the light source 305 has been turned off, is produced by the comparison circuit 342 to be supplied to a discrimination circuit 343.

The discrimination circuit 343 discriminates the presence/absence of the rectangular waveform S3 at the time immediately after the light source 305 has been turned off and accumulates the number of the rectangular waveforms S3 to discriminate the pattern of the latent image mark 302 formed on the card 313. Further, the detected data is decoded by a comparison thereof with a previously-stored bar code pattern to indicate the result on an indicator portion 344.

Figure 44:
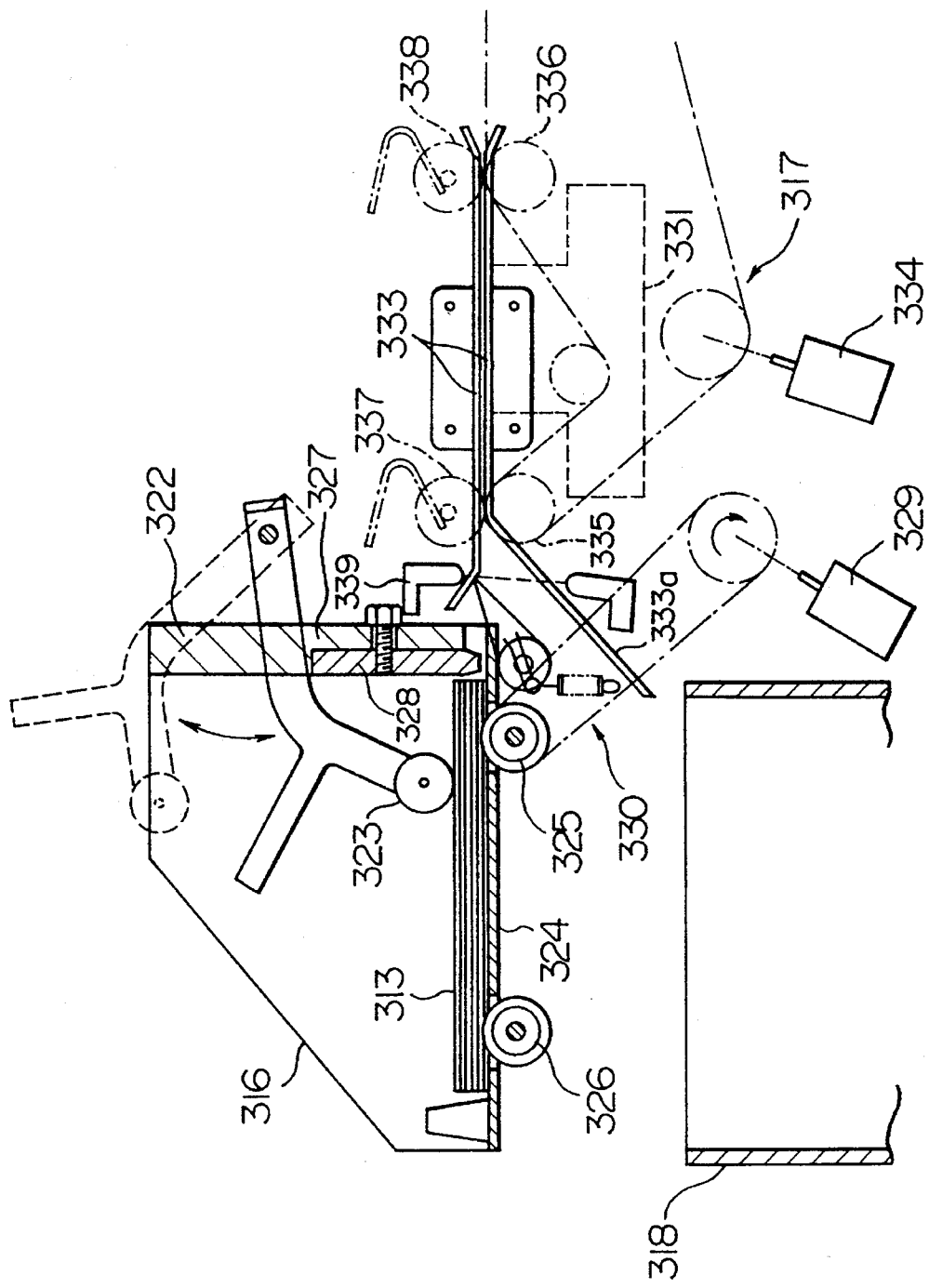
FIG. 44 is a sectional view of a card supply portion of the card reader/writer.

If the detected data is valid, the forward operation of the motor 334 is continued and supplies the data to a card data processing portion 319 (see FIG. 43). If a discrimination has been made that the data is invalid or if no data detection has been performed, the motor 334 is rotated reversely to send the card 313 to the invalid card discharge portion 318. As shown in FIG. 44, an end 333a of the lower guide rail 333 extends to the invalid card discharge portion 318 to also serve as an invalid card discharge guide portion.

Data is written on a magnetic layer 346 (see FIG. 45) of the card 313 sent to the card data processing portion 319 by a magnetic head 345 (see FIG. 43) before the card 313 is discharged to the card accommodating portion 320. Further, information corresponding to the processing operation is returned to the personal computer 312 to display the results of the process on a display 347 and to them by the printer 314.

The card 313 is, as shown in FIG. 45, formed by a substrate 348 made of polyester containing white pigment, a printed layer 349 having one side on which an arbitrary design or the like is printed, the magnetic layer formed on the other side of the substrate 348, a base layer 350 formed on the magnetic layer 346 and a bar code-shaped latent image mark 302 formed on the base layer 350.

The base layer 350 was produced in such a manner that, for example, 50 parts by weight of aluminum powder, 50 parts by weight of polyester resin (Byron 280 manufactured by Toyobo Co., Ltd.) and 200 parts by weight of methylethylketone were kneaded in a ball mill for 48 hours to prepare paint for the base layer, and the paint was deposit on the entire surface of the magnetic layer 346 and was dried so that the base layer 350 having a thickness of about 4 μm was formed.

The fluorescent mark 302 is formed in such a manner that fluorescent powder, in which the liminescent center served by a rare earth element, such as neodymium (Nd), ytterbium (Yb), europium (Eu), thulium (Tm), praseodymium (Pr) or dysprosium (Dy) or their mixture, is contained, in a host material, in the form of a fluoride, thereof on an oxide thereof such as a phosphate, a molybdate or a tungstate is mixed with ultraviolet ray-curing resin to prepare fluorescent paint. As an alternative to this, the fluorescent power is mixed and dispersed with a binder resin such as a vinyl chloride-vinyl acetate copolymer, polyurethane resin, polyester resin or an alkyd resin, and with an organic solvent such as methylethylketone, tetrahydrofuran or ethyl acetate cellosolve to prepare the fluorescent paint. The obtained fluorescent paint is deposited on the surface of the base layer 350 and is dried so that the latent image mark 302 is formed.

Specifically, fluorescent paint containing fluorescent fine powder of $NaY_{0.69}Yb_{0.3}Er_{0.01}F_4$ is screen-printed so that the latent image mark 302 is formed. When light in the near infrared region in the vicinity of the wavelength of 970 nm is applied, infrared rays, the peak wavelength of which is present in the vicinity of 540 nm, are emitted.

In the reading apparatus of this type, an optical system is formed in which light emitted from the light source 305 is passed through the slit 303 to irradiate the latent image mark 302, the latent image mark 302 emits excited light when it is irradiated with the infrared light, and the excited light is again passed through the slit 303 to be incident on the light receiving device 307. The inventors of the present invention have investigated the dimensional factors of the optical system, such as the width of the latent image mark 302, the interval between the latent image marks 302 and the width of the slit 303. As a result, it has been found that the output characteristics of the light receiving device 307 was considerably affected by a conveyance direction interval between the latent image marks 302 relative to a conveyance direction width of the latent image mark 302, an interval between the latent image mark 302 and the slit plate 304 relative to the conveyance direction width of the latent image mark 302, and the interval between the slit plate 304 and the latent image mark 302 relative to an interval between the light source 305 (the light receiving device 307) and the latent image mark 302.

Dimensional relationships will now be described with reference to FIGS. 39 to 41, and FIGS. 42A and 42B.

Figure 39:
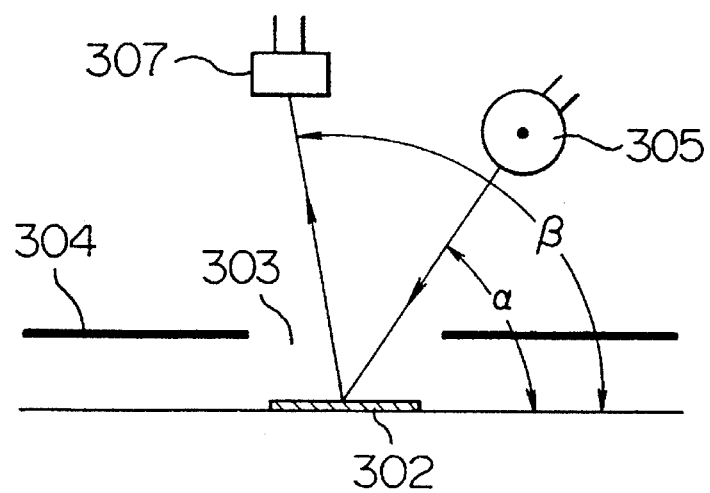
FIG. 39 is a schematic side elevational view of a reading apparatus according to an embodiment of the present invention.

As described above, the bar-shaped latent image mark 302 is so printed that the longitudinal direction of the latent image mark 302 is perpendicular to the mark reading direction, the slit plate 304 is so disposed that the lengthwise direction of the slit 303 of slit plate 304 is substantially parallel with the longitudinal direction of the latent image mark 302, and the direction, in which the light source 305 and the light receiving device 307 are aligned, is substantially parallel to the lengthwise direction of the latent image mark 302 (see FIG. 39).

Figure 40:
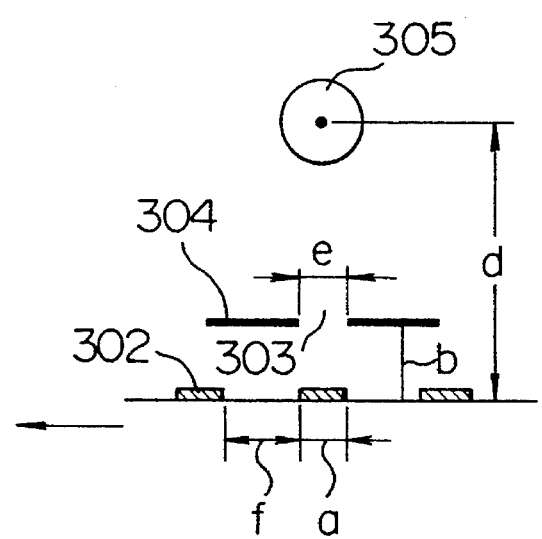
FIG. 40 is a schematic front elevational view of the reading apparatus according to the embodiment of the present invention.
Figure 41:
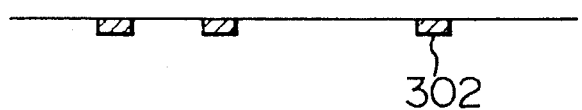
FIG. 41 is a view which illustrates a state where a latent image mark is formed.

Defining the symbols a, b, d, e and f shown in FIG. 40 are defined as follows:

a: the width of the latent image mark 302 in the reading direction;

b: the interval between the latent image mark 302 and the slit 304;

d: the interval between the light source 305 or light receiving device 307 that is more adjacent to the latent image mark 302 (in this embodiment, the light source 305) and the latent image mark 302;

e: the width of the slit in the reading direction; and f: the interval between the latent image marks 302 in the reading direction.

Investigations have been made about the ratio (f/a) of the interval (f) between the latent image marks 302 in the reading direction with respect to the width (a) of the latent image mark 302 in the reading direction, the ratio (e/a) of the interval (e) between the latent image mark 302 and the slit plate 304 with respect to the width (a) of the latent image mark 302 in the reading direction, and the ratio (b/d) of the interval (b) between the slit plate 304 and the latent image mark 302 with respect to the interval d between the light source 305 (or the light receiving device 307) that is more adjacent to the latent image mark 302 and the latent image mark 302.

EXAMPLES

Example 1

The (1×5 mm) bar-shaped latent image marks 302 each having the width (a) in the reading direction of 1 mm and longitudinal length of 5 mm was screen-printed in such a manner that the intervals (f) in the reading direction was 2 mm. As the slit plate 304, carbon ink was screen-printed on a transparent film to have the width (e) of the light transmissive portion (the portion to serve as the slit) 303 in the reading direction to be 1 mm and the longitudinal length of the same to be 6 mm (1×6 mm).

Further, the interval (b) between the latent image mark 302 and the slit plate 304 was made to be 0.5 mm, the interval (d) between the latent image mark 302 and the light source 305 was made to be 5 mm, and the interval between the latent image mark 302 and the light receiving device 307 was made to be 7 mm.

That is, a=1 mm, b=0.5 mm, d=5 mm, e=1 mm and f=2 mm in this Example 1, thereby providing f/a=2, e/a=1 and b/d=0.1.

Example 2

The arrangement was made similarly to the Example 1 except that the interval (f) between the latent image marks 302 in the reading direction was made to be 1.4 mm.

That is, a=1 mm, b=0.5 mm, d=5 mm, e=1 mm and f=1.4 mm in the Example 2, thereby providing f/a=1.4, e/a=1 and b/d=0.1.

Example 3

The arrangement was made similarly to the Example 1 except that the interval (f) between the latent image marks 302 in the reading direction was made to be 3 mm.

That is, a=1 mm, b=0.5 mm, d=5 mm, e=1 mm and f=3 mm in Example 3, thereby providing f/a=3, e/a=1 and b/d=0.1.

Example 4

The arrangement was made similarly to the Example 1 except that the width (e) of the slit 303 in the reading direction was made to be 0.6 mm.

That is, a=1 mm, b=0.5 mm, d=5 mm, e=0.6 mm and f=2 mm in the Example 4, thereby providing f/a=2, e/a=0.6 and b/d=0.1.

Example 5

The arrangement was made similarly to the Example 1 except that the width (e) of the slit 303 in the reading direction was made to be 0.7 mm.

That is, a=1 mm, b=0.5 mm, d=5 mm, e=0.7 mm and f=2 mm in the Example 5, thereby providing f/a=2, e/a=0.7 and b/d=0.1.

Example 6

The arrangement was made similarly to the Example 1 except that the width (e) of the slit 303 in the reading direction was made to be 1.2 mm.

That is, a=1 mm, b=0.5 mm, d=5 mm, e=1.2 mm and f=2 mm in the Example 6, thereby providing f/a=2, e/a=1.2 and b/d=0.1.

Example 7

The arrangement was made similarly to Example 1 except that the width (e) of the slit 303 in the reading direction was made to be 1.4 mm.

That is, a=1 mm, b=0.5 mm, d=5 mm, e=1.4 mm and f=2 mm in the Example 7, thereby providing f/a=2, e/a=1.4 and b/d=0.1.

Example 8

The arrangement was made similarly to the Example 1 except that the interval (b) between the latent image mark 302 and the slit plate 304 was made to be 0.2 mm and that the interval (d) between the latent image mark 302 and the light source 305 was made to be 6.7 mm.

That is, a=1 mm, b=0.2 mm, d=6.7 mm, e=1 mm and f=2 mm in the Example 8, thereby providing f/a=2, e/a=1 and b/d=0.03.

Example 9

The arrangement was made similarly to the Example 1 except that the interval (b) between the latent image mark 302 and the slit plate 304 was made to be 0.2 mm and that the interval (d) between the latent image mark 302 and the light source 305 was made to be 4 mm.

That is, a=1 mm, b=0.2 mm, d=4 mm, e=1 mm and f=2 mm in the Example 9, thereby providing f/a=2, e/a=1 and b/d=0.05.

Example 10

The arrangement was made similarly to the Example 1 except that the interval (b) between the latent image mark 302 and the slit plate 304 was made to be 1 mm.

That is, a=1 mm, b=1 mm, d=5 mm, e=1 mm and f=2 mm in the Example 10, thereby providing f/a=2, e/a=1 and b/d=0.2.

Example 11

The arrangement was made similarly to the Example 1 except that the interval (b) between the latent image mark 302 and the slit plate 304 was made to be 1.5 mm.

That is, a=1 mm, b=1.5 mm, d=5 mm, e=1 mm and f=2 mm in Example 11, thereby providing f/a=2, e/a=1 and b/d=0.3.

Comparative Example 1

The arrangement was made similarly to the Example 1 except that the interval (f) between the latent image marks 302 in the reading direction was made to be 1 mm.

That is, a=1 mm, b=0.5 mm, d=5 mm, e=1 mm and f=1 mm in the Comparative Example 1, thereby providing f/a=1, e/a=1 and b/d=0.1.

Comparative Example 2

The arrangement was made similarly to the Example 1 except that the width (e) of the slit 303 in the reading direction was made to be 0.5 mm.

That is, a=1 mm, b=0.4 mm, d=5 mm, e=0.5 mm and f=2 mm in the Comparative Example 2, thereby providing f/a=2, e/a=0.4 and b/d=0.1.

Comparative Example 3

The arrangement was made similarly to the Example 1 except that the width (e) of the slit 303 in the reading direction was made to be 1.5 mm.

That is, a=1 mm, b=0.5 mm, d=5 mm, e=0.5 mm and f=2 mm in the Comparative Example 3, thereby providing f/a=2, e/a=1.5 and b/d=0.1.

Comparative Example 4

The arrangement was made similarly to the Example 1 except that the interval (b) between the latent image mark 302 and the slit plate 304 was made to be 2 mm.

That is, a=1 mm, b=2 mm, d=5 mm, e=5 mm and f=2 mm in the Comparative Example 4, thereby providing f/a=2, e/a=5 and b/d=0.4.

Manufactured sample cards according to the Examples and the Comparative examples were conveyed at a speed of 50 cm/sec, the output from the light receiving device was amplified, and converted into pulses taking ⅔ of the output voltage (the signal level+the noise) was as the slice level.

Figure 42A:
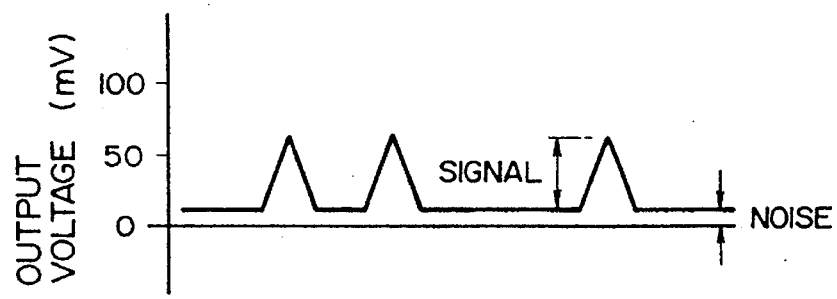
FIG. 42A is a graph which illustrates a waveform, of an output from the light receiving device, after the output has been amplified.
Figure 42B:
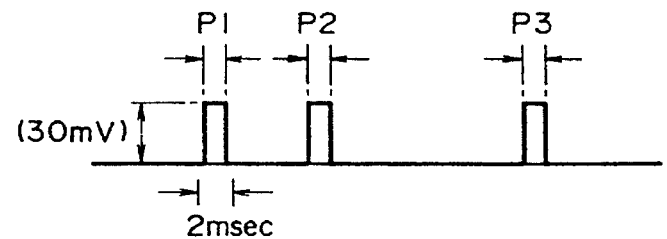
FIG. 42B is a graph which illustrates a waveform, of an output from the light receiving device after a signal of the waveform shown in FIG. 42A has been changed into pulses.

The state of outputs in the foregoing cases corresponding to the positions of the latent image marks 302 (see FIG. 41) are shown in FIG. 42A and FIG. 42B. FIG. 42A shows the waveform after the output from the light receiving device has been amplified, and FIG. 42B shows the waveform after conversion into the pulse.

The S/N and the pulse width ratios (P1/P3) and (P2/P3) shown in FIG. 42B of the respective sample cards are shown in Table 2 and Table 3. As apparent from Table 2, Examples 1 to 3 are examples in which the values of e/a and b/d are kept constant while the value of f/a is varied. Examples 4 to 7 are examples in which the values of f/a and b/d are kept constant while the value of e/a is varied. Examples 8 to 11 are examples in which the values of f/a, e, a and d are kept constant while the value of b/d is varied.

TABLE 2

Relationship of f/a, e/a and b/d with S/N and Pulse Width Ratio

|  | f/a | e/a | b/d | S/N | Pulse Width Ratio P1/P3 | Pulse Width Ratio P2/P3 |
|---|---|---|---|---|---|---|
| Example 1 | 2 | 1 | 0.1 | 5.0 | 1 | 1 |
| Example 2 | 1.4 | 1 | 0.1 | 5.0 | 1 | 1 |
| Example 3 | 3 | 1 | 0.1 | 5.0 | 1 | 1 |
| Example 4 | 2 | 0.6 | 0.1 | 3.7 | 1 | 1 |
| Example 5 | 2 | 0.7 | 0.1 | 4.3 | 1 | 1 |
| Example 6 | 2 | 1.2 | 0.1 | 5.1 | 1 | 1.02 |
| Example 7 | 2 | 1.4 | 0.1 | 5.1 | 1 | 1.05 |
| Example 8 | 2 | 1 | 0.03 | 4.9 | 1 | 1 |
| Example 9 | 2 | 1 | 0.05 | 4.9 | 1 | 1 |
| Example 10 | 2 | 1 | 0.2 | 4.8 | 1 | 1 |
| Example 11 | 2 | 1 | 0.3 | 4.5 | 1 | 1 |

TABLE 3

Relationship of f/a, e/a and b/d with S/N and Pulse Width Ratio

|  | f/a | e/a | b/d | S/N | Pulse Width Ratio P1/P3 | Pulse Width Ratio P2/P3 |
|---|---|---|---|---|---|---|
| Comparative Example 1 | 1 | 1 | 0.1 | 3.0 | 1 | 1.2 |
| Comparative Example 2 | 2 | 0.4 | 0.1 | 2.5 | 1 | 1.15 |
| Comparative Example 3 | 2 | 2 | 0.1 | 2.0 | 1 | 1.9 |
| Comparative Example 4 | 2 | 1 | 0.4 | 3.1 | 1 | 1.4 |

As apparent from Table 2 (the examples of the present invention) and Table 3 (the comparative examples), the value of f/a should be 1.4 or larger, preferably 2 or larger to prevent the pulse width change.

If the value of e/a is less than 0.6, sufficient S/N cannot be obtained. If the value of e/a is larger than 1.4, the pulse width will be changed. Therefore, it is recommenced to restrict the value of e/a to range 0.6 to 1.4, more preferably 0.7 to 1.2.

If the value of b/d is less than 0.03, the slit plate excessively approaches the fluorescent mark in an actual case to damage the mark. If the value of b/d is larger than 0.3, the pulse width will be changed. Therefore, it is recommended to restrict the value of b/d to range 0.03 to 0.3, more preferably 0.05 to 0.2.

As described before, the occurrence of change in the pulse width arises a necessity of using a complicated signal processing circuit capable of correcting the change, so that the structure of the reading apparatus becomes too complicated, and therefore the cost rises excessively.

As described above, the present invention is arranged to restrict the ratio (f/a) of the interval (f) between the latent image marks in the reading direction with respect to the width (a) of the latent image marks in the reading direction, the ratio (e/a) of the width (e) of the light transmissive portion in the reading direction with respect to the width (a) of the latent image marks, and the ratio (b/d) of the interval (b) between the slit plate and the latent image mark with respect to the interval (d) between one of the light source or the light receiving device, that is more adjacent to the latent image mark, and the latent image mark. As a result, excellent S/N can be obtained and a signal, in which the pulse width change is significantly reduced, can be obtained. Therefore, the latent image mark can adequately be read without using the complicated conversion circuit. Consequently, the cost can be reduced.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A latent image forming member comprising a base, and an information indication layer on said base having a latent image pattern thereon in which fluorescent grains are dispersed and held, so that said information indication layer when irradiated with light having a predetermined wavelength excites said fluorescent grains, and information of light emitted from said fluorescent grains is optically read, wherein reflectance of a surface of said base with respect to light having said predetermined wavelength is 20% or higher, and a projection amount of said information indication layer from a top surface of said base is restricted to a range of from 0.5 to 20 μm, and a protection sheet is disposed which is laminated onto said base to cover the entire surface of said information indication layer and which permits light having said predetermined wavelength to pass therethrough.

2. A latent image forming member according to claim 1, wherein a non-solvent type adhesive agent layer is formed on a surface, of said protection sheet, adjacent to said information indication layer.

3. A latent image forming member according to claim 1, wherein a softening point of said information indication layer is 80° C. or higher.

4. A latent image forming member according to claim 1, wherein said base is made of white opaque vinyl chloride type resin.

5. A latent image forming member according to claim 1, wherein a shape of said latent image forming member is in the form of a card.

6. An optical reading apparatus comprising:

an optical head body having a reading opening portion therein;

a slit sheet having a slit-shaped light transmissive portion and disposed adjacent to said reading opening portion of said optical head body;

a light emitting device for emitting light toward an object to be detected through said light transmissive portion of said slit sheet and said reading opening portion of said optical head body; and a light receiving device for receiving light from said object to be detected through said reading opening of said optical head body and said light transmissive portion of said slit sheet, wherein a sheet pressing member made of opaque material is disposed which presses said slit sheet against a portion, in the vicinity of said reading opening portion, of an inside face of said optical head body, said sheet pressing member has a light restriction hole corresponding to said light transmissive portion of said slit sheet, the other side of said light restriction hole corresponds to a light emitting portion of said light emitting device and a light receiving portion of said light receiving device, and a portion, in the vicinity of said light transmissive portion, of said slit sheet is covered with one end face of said sheet pressing member.

7. An optical reading apparatus according to claim 6, wherein another end face of said sheet pressing member covers an end face of said light emitting device except for said light emitting portion and an end face of said light receiving device except for said light receiving portion.

8. An optical reading apparatus according to claim 6, wherein said sheet pressing member also serves as a device holder for holding said light emitting device and said light receiving device.

9. An optical reading apparatus according to claim 6, wherein said slit sheet is composed of a transparent base film and an opaque layer printed on a surface of said base film, and a portion in which no opaque layer is printed is made to be said light transmissive portion.

10. An optical reading apparatus according to claim 6, wherein said object to be detected has a fluorescent mark.

11. An information recording medium with latent image marks comprising a base, and a multiplicity of the latent image marks formed on the base the marks containing fluorescent material substance, wherein said latent image marks are adapted to emit light, when the marks are irradiated with light having a predetermined wavelength, a portion of the light emitted from said latent image mark that is emitted immediately after said irradiation light has been shielded being received so that an interval and number of said latent image marks are detected, wherein a ratio (f/a) of an interval (f) between said latent image marks in a direction in which said latent image mark is read with respect to a width (a) of said latent image mark in said reading direction is 1.4 or more.

12. An information recording medium with said latent image marks according to claim 11, wherein said latent image mark is a bar-shaped mark having its longitudinal direction in a direction perpendicular to said reading direction of said latent image marks.

13. A system for reading an information recording medium with latent image marks, comprising:

an information recording medium in which a multiplicity of the bar-shaped latent image marks each containing fluorescent substance and having its longitudinal direction in a direction perpendicular to a reading direction are formed on a base thereof, information being constituted by an interval and number of said latent image marks;

a latent image mark reading apparatus having a light source for irradiating said latent image mark with light having a predetermined wavelength, a light receiving device which receives light emitted from said latent image mark when said latent image mark is irradiated with light and which is disposed with respect to said light source in a direction substantially in parallel to the longitudinal direction of said latent image mark, and a slit plate disposed between said information recording medium and said light source and light receiving device, and having a light transmissive portion extending substantially in parallel to said longitudinal direction of said latent image mark, wherein said latent image mark is irradiated with light emitted from said light source and a portion, of excited light emitted from said latent image mark, that is emitted immediately after said irradiation light has been shielded is received by said light receiving device to detect the interval and the number of said latent image marks, wherein a ratio (f/a) of an interval (f) between said latent image marks in a direction in which said latent image mark is read with respect to a width (a) of said latent image mark in said reading direction is restricted to be 1.4 or more, and a ratio (e/a) of a width (e) of said light transmissive portion in said reading direction of said latent image mark with respect to the width (a) of said fluorescent mark in said reading direction is restricted to a range of 0.6 to 1.4.

14. A system for reading an information recording medium with latent image marks, comprising:

an information recording medium in which a multiplicity of the bar-shaped latent image marks each containing fluorescent substance, having its longitudinal direction in a direction perpendicular to a reading direction are formed on a base thereof, information being constituted by an interval and number of said latent image marks;

a latent image mark reading apparatus having a light source for irradiating said latent image mark with light having a predetermined wavelength, a light receiving device which receives light emitted from said latent image mark when said latent image mark is irradiated with light and which is disposed with respect to said light source in a direction substantially in parallel to the longitudinal direction of said latent image mark, and a slit plate disposed between said information recording medium and said light source and light receiving device, and having a light transmissive portion extending substantially in parallel to said longitudinal direction of said latent image mark, wherein said latent image mark is irradiated with light emitted from said light source and a portion, of light emitted from said latent image mark, that is emitted immediately after said irradiation light has been shielded is received by said light receiving device to detect the interval and the number of said latent image marks, wherein a ratio (f/a) of an interval (f) between said latent image marks in a direction in which said latent image mark is read with respect to a width (a) of said latent image mark in said reading direction is restricted to be 1.4 or more, a ratio (e/a) of a width (e) of said light transmissive portion in said reading direction with respect to the width (a) of said latent image mark is restricted to a range of 0.6 to 1.4, and a ratio (b/d) of an interval (b) between said slit plate and said latent image mark with respect to an interval (d) between one of said light source and said light receiving device that is more adjacent to said latent image mark and said latent image mark is restricted to a range of 0.03 to 0.3.

15. A latent image reading apparatus comprising an insertion portion for an article on which a latent image is formed by a fluorescent material which emits light when it is stimulated by infrared rays, an infrared ray source for irradiating the latent image formed surface of said article inserted into said insertion portion, and a light detection device for receiving excited light from said latent image, wherein an infrared ray emitting diode is used as said infrared ray source, a photo-diode is used as said light detection device, and said infrared ray emitting diode and said photo-diode are set within an angular range of ±10 degrees or less from a direction normal to said latent image formed surface of said article inserted into said insertion portion, wherein said infrared ray emitting diode has a relative radiation intensity of 80% or higher of a radiation intensity of infrared rays emitted in the normal direction of the light emission surface at a direction inclined from said normal direction of said light emission surface by 35 degrees, and said photo-diode has an 80% or higher relative light receiving sensitivity for light from a direction inclined by 15 degrees from the normal direction of the light receiving surface with respect to a light receiving sensitivity for light incident from said normal direction of said light receiving surface.

16. A latent image reading apparatus according to claim 15, wherein a slit for restricting a range of said article to be irradiated with infrared rays is formed between said latent image formed surface of said article, and said infrared ray emitting diode and photo-diode, and a clearance between said slit and said latent image formed surface of said article is adjusted to be 3 mm or less.

17. A latent image reading apparatus according to claim 15, wherein a distance from the light emission surface of said infrared ray source to said latent image formed surface of said article is 5 mm or shorter.

18. A latent image reading apparatus according to claim 15, wherein said article is a card on which a bar code type latent image is formed.

\* \* \* \* \*